(12) United States Patent
Miller et al.

(10) Patent No.: US 10,505,394 B2
(45) Date of Patent: Dec. 10, 2019

(54) POWER GENERATION NECKLACES THAT MITIGATE ENERGY ABSORPTION IN THE HUMAN BODY

(71) Applicant: Spy Eye, LLC, Los Gatos, CA (US)

(72) Inventors: Gregory David Miller, San Jose, CA (US); Brian Elliot Lemoff, Morgan Hill, CA (US); Hawk Yin Pang, San Jose, CA (US); Michael West Wiemer, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 15/959,169

(22) Filed: Apr. 21, 2018

(65) Prior Publication Data
US 2019/0326781 A1  Oct. 24, 2019

(51) Int. Cl.
*H02J 50/10* (2016.01)
*G02B 27/01* (2006.01)
(Continued)

(52) U.S. Cl.
CPC .......... *H02J 50/10* (2016.02); *G02B 27/017* (2013.01); *H04B 5/0037* (2013.01); *G06T 19/006* (2013.01); *H04B 5/0031* (2013.01)

(58) Field of Classification Search
None
See application file for complete search history.

(56) References Cited

U.S. PATENT DOCUMENTS 4,014,321 A * 3/1977 March ............... A61B 5/14555
356/39
4,577,545 A * 3/1986 Kemeny ............... F41B 6/006
124/3
(Continued)

FOREIGN PATENT DOCUMENTS

CA        2280022      1/2001
WO    WO 2016/014118  1/2016
(Continued)

OTHER PUBLICATIONS

Kao, H-L. et al., "DuoSkin: Rapidly Prototyping On-Skin User Interfaces Using Skin-Friendly Materials," ISWC'16, ACM, Sep. 12-16, 2016, 8 pages.
(Continued)

*Primary Examiner* — Curtis J King
(74) *Attorney, Agent, or Firm* — Fenwick & West LLP

(57) ABSTRACT

An augmented reality system including a necklace and a contact lens display can be used to project information from the contact lens display onto the retina of the wearer's eye. In one example, the necklace generates a time-varying magnetic field (TVMF) that provides energy and information to the contact lens display via inductive coupling. The necklace can be configured to minimize the amount of energy absorbed by the body of the wearer while maintaining power transfer to the contact lens display. In one example, the necklace includes multiple conductive coils generating constructively interfering TVMs to effectively transmit energy while reducing the amount of energy absorbed by the human body. In another example, the necklace includes a parasitic coil generating a destructively interfering TVMF and a magnetic shield to effectively transmit energy while reducing the amount of energy absorbed by the human body.

20 Claims, 20 Drawing Sheets

(51) Int. Cl.
*H04B 5/00* (2006.01)
*G06T 19/00* (2011.01)

(56) References Cited

U.S. PATENT DOCUMENTS

| | | | |
|---|---|---|---|
| 4,871,247 A | 10/1989 | Haynes | |
| 4,941,068 A * | 7/1990 | Hofmann | A61N 1/44 |
| | | | 128/202.25 |
| 5,331,149 A | 7/1994 | Spitzer et al. | |
| 5,467,104 A | 11/1995 | Furness et al. | |
| 5,638,218 A | 6/1997 | Oomura | |
| 5,638,219 A | 6/1997 | Medina et al. | |
| 5,682,210 A | 10/1997 | Weirich | |
| 5,699,193 A | 12/1997 | Monno et al. | |
| 5,712,721 A | 1/1998 | Large | |
| 5,726,916 A | 3/1998 | Smyth | |
| 6,120,460 A * | 9/2000 | Abreu | A61B 3/1241 |
| | | | 600/405 |
| 6,181,287 B1 * | 1/2001 | Beigel | G06K 19/07749 |
| | | | 343/741 |
| 6,215,593 B1 | 4/2001 | Bruce | |
| 6,307,945 B1 | 10/2001 | Hall | |
| 6,312,393 B1 | 11/2001 | Abreu | |
| 6,509,743 B1 * | 1/2003 | Ferrero | G01R 31/2822 |
| | | | 324/123 R |
| 6,570,386 B2 | 5/2003 | Goldstein | |
| 6,594,370 B1 * | 7/2003 | Anderson | H01Q 1/273 |
| | | | 381/315 |
| 6,823,171 B1 | 11/2004 | Kaario | |
| 6,851,805 B2 | 2/2005 | Blum et al. | |
| 6,920,283 B2 | 7/2005 | Goldstein | |
| 7,088,235 B1 * | 8/2006 | Carricut | G08B 5/222 |
| | | | 340/539.12 |
| 7,137,952 B2 | 11/2006 | Leonardi et al. | |
| 7,359,059 B2 | 4/2008 | Lust et al. | |
| 7,562,445 B2 * | 7/2009 | Lerch | G06K 19/07749 |
| | | | 235/488 |
| 7,626,562 B2 | 12/2009 | Iwasaki | |
| 7,758,187 B2 | 7/2010 | Amirparviz | |
| 7,835,056 B2 | 11/2010 | Doucet et al. | |
| 7,893,832 B2 * | 2/2011 | Laackmann | G06K 19/07 |
| | | | 235/375 |
| 8,077,245 B2 | 12/2011 | Adamo et al. | |
| 8,087,777 B2 | 1/2012 | Rosenthal | |
| 8,096,654 B2 | 1/2012 | Amirparviz et al. | |
| 8,348,422 B2 | 1/2013 | Pugh et al. | |
| 8,348,424 B2 | 1/2013 | Pugh et al. | |
| 8,394,660 B2 | 3/2013 | Kim et al. | |
| 8,398,239 B2 | 3/2013 | Horning et al. | |
| 8,430,310 B1 | 4/2013 | Ho et al. | |
| 8,441,731 B2 | 5/2013 | Sprague | |
| 8,446,341 B2 | 5/2013 | Amirparviz et al. | |
| 8,482,858 B2 | 7/2013 | Sprague | |
| 8,520,309 B2 | 8/2013 | Sprague | |
| 8,526,879 B2 | 9/2013 | Kristiansen et al. | |
| 8,579,434 B2 | 11/2013 | Amirparviz et al. | |
| 8,582,209 B1 | 11/2013 | Amirparviz | |
| 8,608,310 B2 | 12/2013 | Otis et al. | |
| 8,632,182 B2 | 1/2014 | Chen et al. | |
| 8,721,074 B2 | 5/2014 | Pugh et al. | |
| 8,764,185 B1 | 7/2014 | Biederman et al. | |
| 8,781,570 B2 | 7/2014 | Chuang et al. | |
| 8,786,520 B2 | 7/2014 | Legerton et al. | |
| 8,786,675 B2 | 7/2014 | Deering | |
| 8,798,332 B2 | 8/2014 | Otis et al. | |
| 8,827,445 B1 | 9/2014 | Wiser et al. | |
| 8,830,571 B1 | 9/2014 | Vizgaitis | |
| 8,870,370 B1 * | 10/2014 | Otis | G02C 7/04 |
| | | | 351/159.03 |
| 8,874,182 B2 | 10/2014 | Etzkorn et al. | |
| 8,906,088 B2 | 12/2014 | Pugh et al. | |
| 8,911,078 B2 | 12/2014 | Meyers | |
| 8,922,898 B2 | 12/2014 | Legerton et al. | |
| 8,931,906 B2 | 1/2015 | Huang et al. | |
| 8,960,898 B1 | 2/2015 | Etzkorn et al. | |
| 8,963,268 B2 | 2/2015 | Kim et al. | |
| 8,964,298 B2 | 2/2015 | Haddick et al. | |
| 8,971,978 B2 | 3/2015 | Ho et al. | |
| 8,985,763 B1 | 3/2015 | Etzkorn et al. | |
| 8,989,834 B2 | 3/2015 | Ho et al. | |
| 9,000,000 B2 | 4/2015 | Carroll | |
| 9,028,068 B2 | 5/2015 | Chang | |
| 9,039,171 B2 | 5/2015 | Groisman | |
| 9,040,923 B2 | 5/2015 | Sprague et al. | |
| 9,047,512 B2 | 6/2015 | Otis et al. | |
| 9,048,389 B2 | 6/2015 | Fu et al. | |
| 9,052,528 B2 | 6/2015 | Pugh et al. | |
| 9,052,533 B2 | 6/2015 | Pugh et al. | |
| 9,054,079 B2 | 6/2015 | Etzkorn | |
| 9,058,053 B2 | 6/2015 | Covington | |
| 9,063,351 B1 | 6/2015 | Ho et al. | |
| 9,063,352 B2 | 6/2015 | Ford et al. | |
| 9,111,473 B1 | 8/2015 | Ho et al. | |
| 9,130,099 B2 | 9/2015 | Robin | |
| 9,130,122 B2 | 9/2015 | Fu et al. | |
| 9,134,546 B2 | 9/2015 | Pugh et al. | |
| 9,153,074 B2 | 10/2015 | Zhou et al. | |
| 9,158,133 B1 | 10/2015 | Pletcher et al. | |
| 9,161,712 B2 | 10/2015 | Etzkorn | |
| 9,170,646 B2 | 10/2015 | Toner et al. | |
| 9,178,107 B2 | 11/2015 | Tsai et al. | |
| 9,192,298 B2 | 11/2015 | Bouwstra et al. | |
| 9,195,075 B2 | 11/2015 | Pugh et al. | |
| 9,196,094 B2 | 11/2015 | Ur | |
| 9,215,293 B2 | 12/2015 | Miller | |
| 9,217,881 B2 | 12/2015 | Pugh et al. | |
| 9,225,375 B2 | 12/2015 | Pugh et al. | |
| 9,244,285 B2 | 1/2016 | Chen et al. | |
| 9,271,677 B2 | 3/2016 | Leonardi | |
| 9,282,920 B2 | 3/2016 | Ho et al. | |
| 9,289,123 B2 | 3/2016 | Weibel et al. | |
| 9,289,954 B2 | 3/2016 | Linhardt et al. | |
| 9,298,002 B2 | 3/2016 | Border et al. | |
| 9,298,020 B1 | 3/2016 | Etzkorn et al. | |
| D754,861 S * | 4/2016 | O'Driscoll | D16/101 |
| 9,307,905 B2 | 4/2016 | Varel et al. | |
| 9,310,626 B2 | 4/2016 | Pugh et al. | |
| 9,316,848 B2 | 4/2016 | Pugh et al. | |
| 9,326,710 B1 | 5/2016 | Liu et al. | |
| 9,332,935 B2 | 5/2016 | Etzkorn et al. | |
| 9,335,562 B2 | 5/2016 | Pugh et al. | |
| 9,341,843 B2 | 5/2016 | Border et al. | |
| 9,366,872 B2 | 6/2016 | Honea et al. | |
| 9,366,881 B2 | 6/2016 | Pugh et al. | |
| 9,389,433 B2 | 7/2016 | Pugh et al. | |
| 9,401,454 B2 | 7/2016 | Robin et al. | |
| 9,414,746 B2 | 8/2016 | Bergman et al. | |
| 9,425,359 B2 | 8/2016 | Tsai et al. | |
| 9,442,307 B2 | 9/2016 | Meyers | |
| 9,442,310 B2 | 9/2016 | Biederman et al. | |
| 9,445,768 B2 | 9/2016 | Alexander et al. | |
| 9,523,865 B2 | 12/2016 | Pletcher et al. | |
| 9,629,774 B2 | 4/2017 | Dayal et al. | |
| 9,728,981 B2 | 8/2017 | Lee | |
| 9,939,658 B1 | 4/2018 | Gutierrez et al. | |
| 10,278,644 B1 * | 5/2019 | Etzkorn | A61B 5/6821 |
| 2002/0084904 A1 * | 7/2002 | De La Huerga | A61J 1/035 |
| | | | 340/573.1 |
| 2002/0101383 A1 * | 8/2002 | Junod | H01Q 7/005 |
| | | | 343/742 |
| 2003/0173408 A1 * | 9/2003 | Mosher, Jr. | A61B 5/117 |
| | | | 235/492 |
| 2003/0179094 A1 * | 9/2003 | Abreu | A61B 5/0002 |
| | | | 340/573.1 |
| 2005/0179604 A1 * | 8/2005 | Liu | G06K 19/07749 |
| | | | 343/742 |
| 2006/0177086 A1 * | 8/2006 | Rye | H04R 1/345 |
| | | | 381/370 |
| 2006/0290882 A1 | 12/2006 | Meyers et al. | |
| 2007/0024423 A1 * | 2/2007 | Nikitin | G06K 19/0723 |
| | | | 340/10.1 |
| 2007/0241986 A1 * | 10/2007 | Lee | H01Q 1/38 |
| | | | 343/867 |

(56) References Cited

U.S. PATENT DOCUMENTS

| | | |
|---|---|---|
| 2009/0058189 A1* | 3/2009 | Cook .................. H04B 5/0037 307/104 |
| 2009/0066722 A1 | 3/2009 | Kriger et al. |
| 2009/0072628 A1* | 3/2009 | Cook .................. H01Q 7/005 307/104 |
| 2010/0001926 A1 | 1/2010 | Amirparviz et al. |
| 2010/0136905 A1* | 6/2010 | Kristiansen .......... H04B 5/0075 455/41.1 |
| 2010/0234717 A1 | 9/2010 | Wismer et al. |
| 2010/0253476 A1* | 10/2010 | Poutiatine ............. A61J 7/0053 340/10.1 |
| 2010/0308749 A1* | 12/2010 | Liu .................... H05B 33/0815 315/307 |
| 2011/0034134 A1* | 2/2011 | Henderson .......... H04M 1/0283 455/90.3 |
| 2011/0221659 A1 | 9/2011 | King et al. |
| 2012/0105226 A1* | 5/2012 | Bourdeau ............... G01S 1/725 340/539.32 |
| 2012/0262003 A1* | 10/2012 | Tetu ..................... H04B 5/0037 307/104 |
| 2013/0050432 A1 | 2/2013 | Perez et al. |
| 2013/0100139 A1 | 4/2013 | Schliesser et al. |
| 2013/0242077 A1 | 9/2013 | Lin et al. |
| 2013/0270664 A1 | 10/2013 | Kim et al. |
| 2014/0016097 A1 | 1/2014 | Leonardi et al. |
| 2014/0063054 A1 | 3/2014 | Osterhout et al. |
| 2014/0081178 A1* | 3/2014 | Pletcher ................... G02C 7/04 600/595 |
| 2014/0098226 A1 | 4/2014 | Pletcher et al. |
| 2014/0120983 A1* | 5/2014 | Lam ...................... H04W 84/18 455/557 |
| 2014/0192311 A1* | 7/2014 | Pletcher ................... G02C 7/04 351/158 |
| 2014/0198128 A1 | 7/2014 | Hong et al. |
| 2014/0240665 A1 | 8/2014 | Pugh et al. |
| 2014/0252868 A1* | 9/2014 | Yamada .................. H01F 38/14 307/104 |
| 2014/0292620 A1 | 10/2014 | Lapstun et al. |
| 2014/0371560 A1* | 12/2014 | Etzkom ................. A61B 5/682 600/365 |
| 2015/0005604 A1 | 1/2015 | Biederman et al. |
| 2015/0016777 A1 | 1/2015 | Abovitz et al. |
| 2015/0060904 A1 | 3/2015 | Robin et al. |
| 2015/0062533 A1 | 3/2015 | Toner et al. |
| 2015/0072615 A1* | 3/2015 | Mofidi .................. H04B 5/0075 455/41.1 |
| 2015/0088253 A1 | 3/2015 | Doll et al. |
| 2015/0123785 A1* | 5/2015 | Haflinger ............... A61B 5/6831 340/539.11 |
| 2015/0126845 A1 | 5/2015 | Jin et al. |
| 2015/0145095 A1 | 5/2015 | Kim et al. |
| 2015/0147975 A1* | 5/2015 | Li ........................ H04M 1/7253 455/41.3 |
| 2015/0148628 A1* | 5/2015 | Abreu .................. A61B 5/0008 600/316 |
| 2015/0150510 A1 | 6/2015 | Leonardi et al. |
| 2015/0171274 A1 | 6/2015 | Guo et al. |
| 2015/0173602 A1* | 6/2015 | Barrows ................. A61B 3/101 600/345 |
| 2015/0223684 A1 | 8/2015 | Hinton et al. |
| 2015/0227735 A1 | 8/2015 | Chappell et al. |
| 2015/0234205 A1 | 8/2015 | Schowengerdt et al. |
| 2015/0235439 A1 | 8/2015 | Schowengerdt et al. |
| 2015/0235440 A1 | 8/2015 | Schowengerdt et al. |
| 2015/0235444 A1 | 8/2015 | Schowengerdt et al. |
| 2015/0235446 A1 | 8/2015 | Schowengerdt et al. |
| 2015/0235457 A1 | 8/2015 | Schowengerdt et al. |
| 2015/0235468 A1 | 8/2015 | Schowengerdt et al. |
| 2015/0235471 A1 | 8/2015 | Schowengerdt et al. |
| 2015/0241698 A1 | 8/2015 | Schowengerdt et al. |
| 2015/0243090 A1 | 8/2015 | Schowengerdt et al. |
| 2015/0261294 A1 | 9/2015 | Urbach et al. |
| 2015/0281411 A1 | 10/2015 | Markus et al. |
| 2015/0301338 A1 | 10/2015 | Van et al. |
| 2015/0305929 A1 | 10/2015 | Goldberg |
| 2015/0339857 A1 | 11/2015 | O'Connor et al. |
| 2015/0362750 A1 | 12/2015 | Yeager et al. |
| 2015/0362752 A1 | 12/2015 | Linhardt et al. |
| 2015/0372395 A1* | 12/2015 | Lavedas ................ H01Q 21/28 343/748 |
| 2015/0380461 A1 | 12/2015 | Robin et al. |
| 2015/0380988 A1 | 12/2015 | Chappell et al. |
| 2016/0006115 A1* | 1/2016 | Etzkom ................ H01Q 1/2225 343/867 |
| 2016/0011419 A1 | 1/2016 | Gao et al. |
| 2016/0018650 A1 | 1/2016 | Haddick et al. |
| 2016/0018651 A1 | 1/2016 | Haddick et al. |
| 2016/0018652 A1 | 1/2016 | Haddick et al. |
| 2016/0018653 A1 | 1/2016 | Haddick et al. |
| 2016/0030160 A1 | 2/2016 | Markus et al. |
| 2016/0049544 A1 | 2/2016 | Robin et al. |
| 2016/0066825 A1 | 3/2016 | Barrows et al. |
| 2016/0080855 A1* | 3/2016 | Greenberg ........... H04R 1/1066 381/74 |
| 2016/0091737 A1 | 3/2016 | Kim et al. |
| 2016/0093666 A1 | 3/2016 | Gilet et al. |
| 2016/0097940 A1 | 4/2016 | Sako et al. |
| 2016/0113760 A1 | 4/2016 | Conrad et al. |
| 2016/0141449 A1 | 5/2016 | Robin et al. |
| 2016/0141469 A1 | 5/2016 | Robin et al. |
| 2016/0143728 A1 | 5/2016 | De et al. |
| 2016/0147301 A1 | 5/2016 | Iwasaki et al. |
| 2016/0154256 A1 | 6/2016 | Yajima et al. |
| 2016/0172536 A1 | 6/2016 | Tsai et al. |
| 2016/0172869 A1 | 6/2016 | Park et al. |
| 2016/0204307 A1 | 7/2016 | Robin et al. |
| 2016/0223842 A1 | 8/2016 | Yun et al. |
| 2016/0253831 A1 | 9/2016 | Schwarz et al. |
| 2016/0261142 A1 | 9/2016 | Park et al. |
| 2016/0270176 A1 | 9/2016 | Robin et al. |
| 2016/0270187 A1 | 9/2016 | Robin et al. |
| 2016/0276328 A1 | 9/2016 | Robin et al. |
| 2016/0299354 A1 | 10/2016 | Shtukater |
| 2017/0023793 A1 | 1/2017 | Shtukater |
| 2017/0042480 A1 | 2/2017 | Gandhi et al. |
| 2017/0168322 A1 | 6/2017 | Toner et al. |
| 2017/0188848 A1* | 7/2017 | Banet ................... A61B 5/0537 |
| 2017/0189699 A1* | 7/2017 | Dellamano .......... H04B 5/0031 |
| 2017/0231337 A1* | 8/2017 | Anderson ............ G03H 1/2294 63/3 |
| 2017/0234818 A1* | 8/2017 | Jesme .................... A61B 5/443 374/54 |
| 2017/0270636 A1 | 9/2017 | Shtukater |
| 2017/0337461 A1* | 11/2017 | Jesme .................... G01J 5/02 |
| 2017/0371184 A1 | 12/2017 | Shtukater |
| 2018/0036974 A1 | 2/2018 | Hahn et al. |
| 2018/0212313 A1* | 7/2018 | Harper ................. H01Q 1/50 |
| 2019/0074823 A1* | 3/2019 | Der ..................... H03K 3/356182 |

FOREIGN PATENT DOCUMENTS

| | | |
|---|---|---|
| WO | WO 2016/022665 | 2/2016 |
| WO | WO 2016/150630 A1 | 9/2016 |
| WO | WO 2016/195201 A1 | 12/2016 |

OTHER PUBLICATIONS

Avestruz, A-T. et al., "Single-Sided AC Magnetic Fields for Induction Heating," 39th Annual Conference of the IEEE, Nov. 10-13, 2013, pp. 5052-5057.

Chronos Vision GmbH, "Scleral Search Coils 2D/3D," 4 pages, [Online][Retrieved Feb. 28, 2019], Retrieved from the internet <http://www.chronos-vision.de/downloads/CV Product SSC.pdf>. (4 pages).

Kenyon, R.V., "A soft Contact Lens Search Coil for Measuring Eye Movements," Vision Research, vol. 25, No. 11, pp. 1629-1633, 1985.

Lupu, R.G. et al., "A Survey of Eye Tracking Methods and Applications," Gheorghe Asachi Technical University of Iasi, Aug. 29, 2013, pp. 71-86.

(56) References Cited

OTHER PUBLICATIONS

Paperno et al., A New Method for Magnetic Position and Orientation Tracking, IEEE Transactions on Magnetics, vol. 37, No. 4, Jul. 2001, pp. 1938-1940.

Umraiya, A, "Design of Miniaturized Coil System Using Mems Technology for Eye Movement Measurement," McGill University, Montreal, Aug. 2009, pp. i-69.

\* cited by examiner

POWER GENERATION NECKLACES THAT MITIGATE ENERGY ABSORPTION IN THE HUMAN BODY

BACKGROUND

1. Technical Field

One or more embodiments of this disclosure relate to reducing the energy absorbed by the human body when wearing an augmented reality system including a necklace and a contact lens display.

2. Description of Related Art

Augmented reality (AR) adds computer-generated information to a person's view of the world around them. Worldwide spending on augmented reality continues to increase alongside increases in the technological capability of AR systems and devices. One type of proposed AR system includes a contact lens display. Delivering power to the contact lens display while reducing the amount of energy absorbed by the wearer is a challenging problem and an active area of development.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

An augmented reality system can be used to assist a wearer of the augmented reality (AR) system in everyday interactions by projecting AR images from a contact lens display onto the retina of the wearer's eye. In some embodiments, the contact lens display is based on tiny projector(s), each one no larger than about one or two millimeters in any dimension, mounted inside a contact lens. Here, these small projectors are called "femtoprojectors" where "femto" is a suggestive, rather than literal, prefix. The femtoprojector in the contact lens projects an image to the user's retina. If the contact lens display is partially transparent, then the image from the femtoprojector is combined with the external scene viewed by the user though the contact lens, thus creating an augmented reality. The AR images from the femtoprojector are overlaid on the image of the external scene.

In some embodiments, the AR system includes an energy source that produces a time-varying magnetic field (TVMF) to provide energy to the femtoprojectors in the contact lens display. The contact lens display receives energy from the source to provide power to elements of the contact lens display (e.g., a femtoprojector). However, in some cases, the human body can absorb some of the energy of the TVMF produced by the source. Therefore, an energy source that minimizes the amount of energy absorbed by the human body can be beneficial.

Here, for example, a source that generates a TVMF can be a necklace worn about the neck of the wearer of the AR system. The necklace includes a time-varying current source (i.e., a signal generator generating an electrical signal) and a conductive coil which generates the TVMF. In various embodiments, the necklace can be configured with any number of conductive coils, magnetic shields, and parasitic coils such that the energy absorbed by wearer of the necklace is mitigated while still providing sufficient power to the contact lens display such that it can project images and information onto the retina of the wearer (e.g., via a femtoprojector).

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
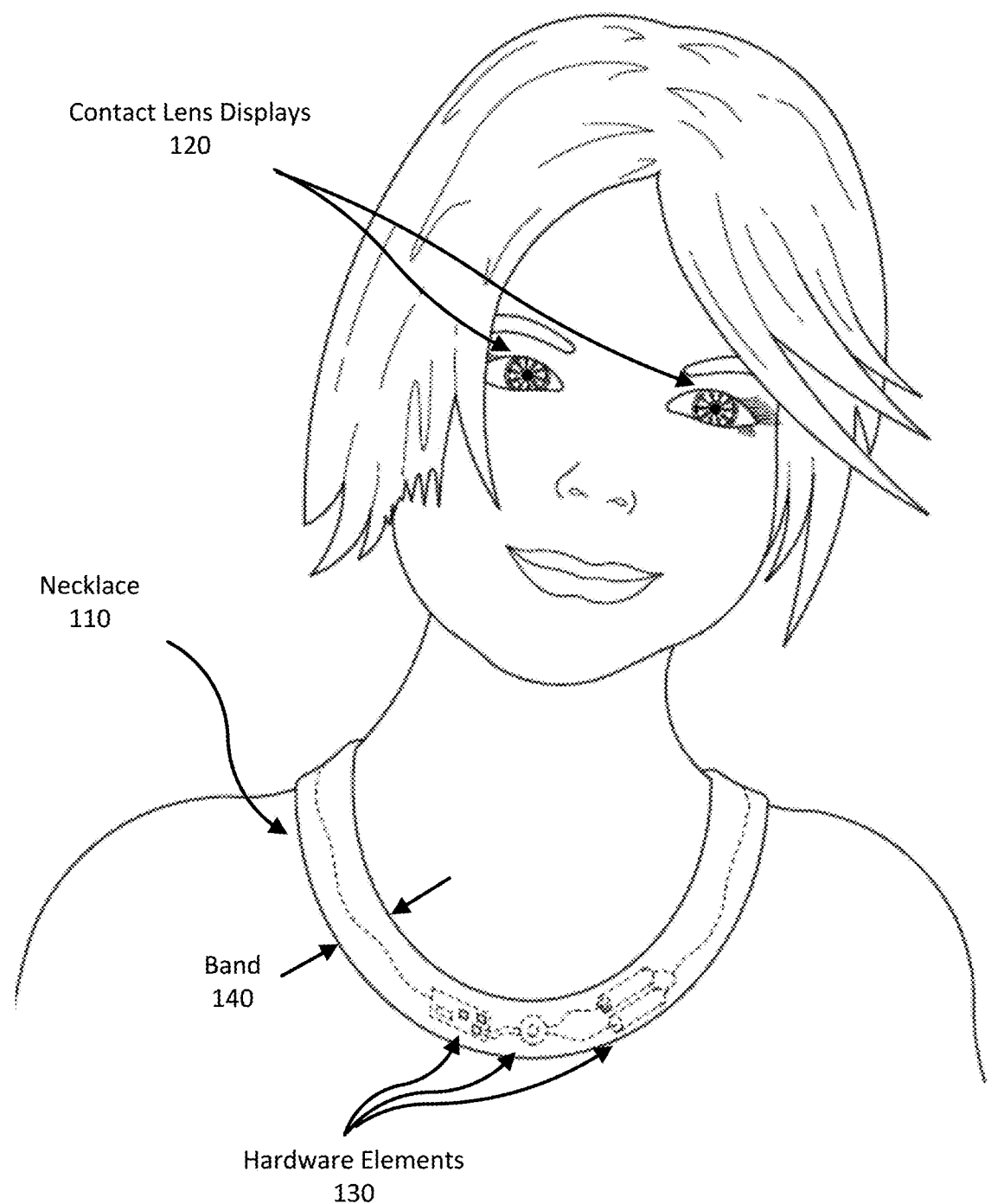
FIG. 1 shows a person wearing an augmented reality system including a necklace.

FIG. 1 shows a person wearing an augmented reality system 100 including a visible necklace 110. Even though the necklace 110 is in plain sight, it may be designed to look like ordinary jewelry and therefore attracts no special notice. In some configurations, the necklace can be hidden underneath the wearer's clothes. Whatever the design of the necklace 110, it does not alter one's impression of the person wearing it. Their appearance other than the addition of the necklace 110 is not affected by the AR system.

Furthermore, the AR system of FIG. 1 does not disturb the wearer. The contact lens displays 120 may also function as regular contact lenses providing refractive eyesight correction if required. The necklace 110 is lightweight and may not need to be held in one's hand like a cell phone or tablet. When the contact lens displays 120 are not showing images, the wearer is hardly conscious of the AR system 100. When the AR system 100 is displaying images, reacting to speech or receiving messages, it provides functions like that of a smartphone but in a more natural way.

In the illustrated necklace 110 of FIG. 1, the necklace 110 includes hardware elements 130 distributed about a band 140 of the necklace 110 which allows for a broader range of necklace designs suitable to a variety of aesthetic tastes. Generally, the band 140 includes a surface configured to be placed against the wearer of the necklace 110 when the necklace 110 is worn about the neck. In other configurations, the necklace includes hardware elements localized to a pendant of the necklace (as in FIG. 2A). Generally, the pendant may be an ornamental object hanging from the necklace 110 that is configured to enclose and conceal the hardware elements 130 of the AR system 100.

While the AR system 100 is illustrated with a necklace 110, in other embodiments the functions of the necklace 110 described herein can be integrated into another type of wearable device. As an example, the functionality of the necklace 110 can be embedded in a necktie, a scarf, a belt, the brim of a hat, the collar of a shirt, the hood of a jacket, the sleeve of a sweater, the front of a t-shirt, etc. Alternatively, the necklace 110 can be coupled to an external electronic device (not pictured) such as a smart phone and the coupled electronic device may facilitate functionality of the AR system 100.

Figure 2A:
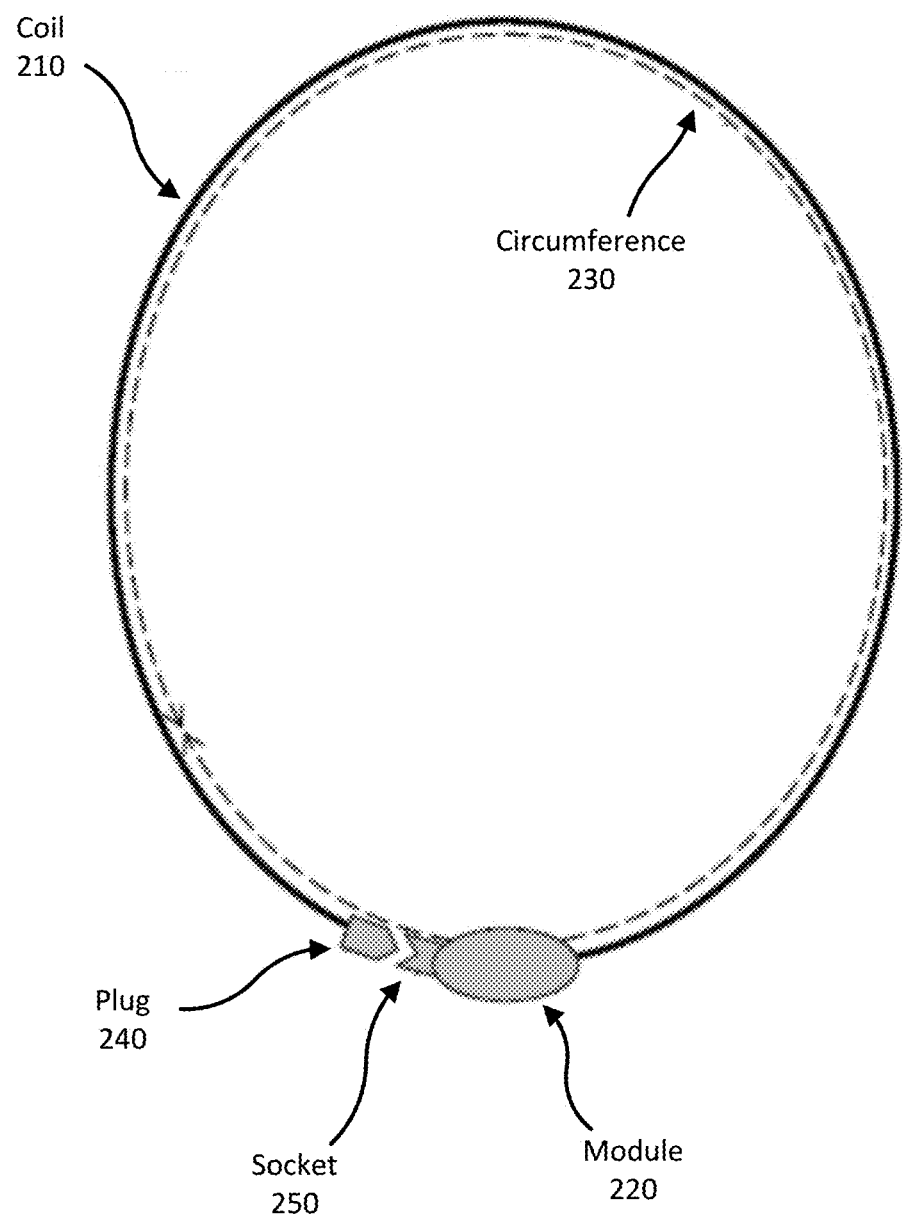
FIG. 2A shows a necklace of an augmented reality system.

FIG. 2A shows a necklace 110 of an unobtrusive augmented reality system 100. In the illustrated embodiment, the necklace 110 includes a coil 210 of conductive material such as an insulated wire and an electronic module 220. Module 220 contains the hardware elements 130 for controlling the augmented reality system 100. In some configurations, the module 220 is a pendant of the necklace. In other configurations, the necklace 110 does not include a module 220 and the hardware elements 130 are distributed about the circumference 230 of the necklace (i.e., as in FIG. 1). While not illustrated, the conductive coil 210 and module 220 can be incorporated into the band 140 of the necklace. In some cases, the circumference 230 of the necklace is the inner diameter of the necklace 110 band 140.

Additionally, the number of conductive turns (i.e., loops) in necklace coil 210 is chosen considering factors such as power requirements of contact lens displays 120, operating frequency, etc. The number of loops in necklace coil 210 can be, for example, between 1 and 200 loops. In some configurations, an unlicensed frequency band can be used to couple the necklace 110 to the contact lens display 120, but any other frequency can be used. In one example, the system can use an industrial, scientific, and medical radio band (ISM).

Furthermore, conductors in the coil 210 may extend around the circumference 230 of the necklace 110 for one, two, three, or more loops. These loops may be connected or disconnected with a plug 240 and socket 250 when putting the necklace 110 on or taking it off. Connecting the plug 240 to the socket 250 allows data and power to be transmitted between the necklace 110 and contact lens display 120, and disconnecting the plug 240 from the socket 250 prevents data and power from being transmitted between the necklace 110 and contact lens display 120. Generally, the coil 210 is configured to be worn around a user's neck as a necklace 110 when the plug 240 and socket 250 are connected. In some configurations, the necklace 110 does not include a plug 240 and socket 250 but still allows for data and power to be transmitted between the necklace 110 and contact lens display 120. In these configurations, any other means of controlling data and power transfer can be included (e.g., a switch, a button, etc.).

In various embodiments, as a wearer of necklace 110 operates the AR system 100 and moves through the environment, the orientation of necklace 110 may vary with that movement (i.e., the shape of the band of necklace may change, relative orientations of the hardware elements 130 in necklace 110 change, etc.).

Figure 2B:
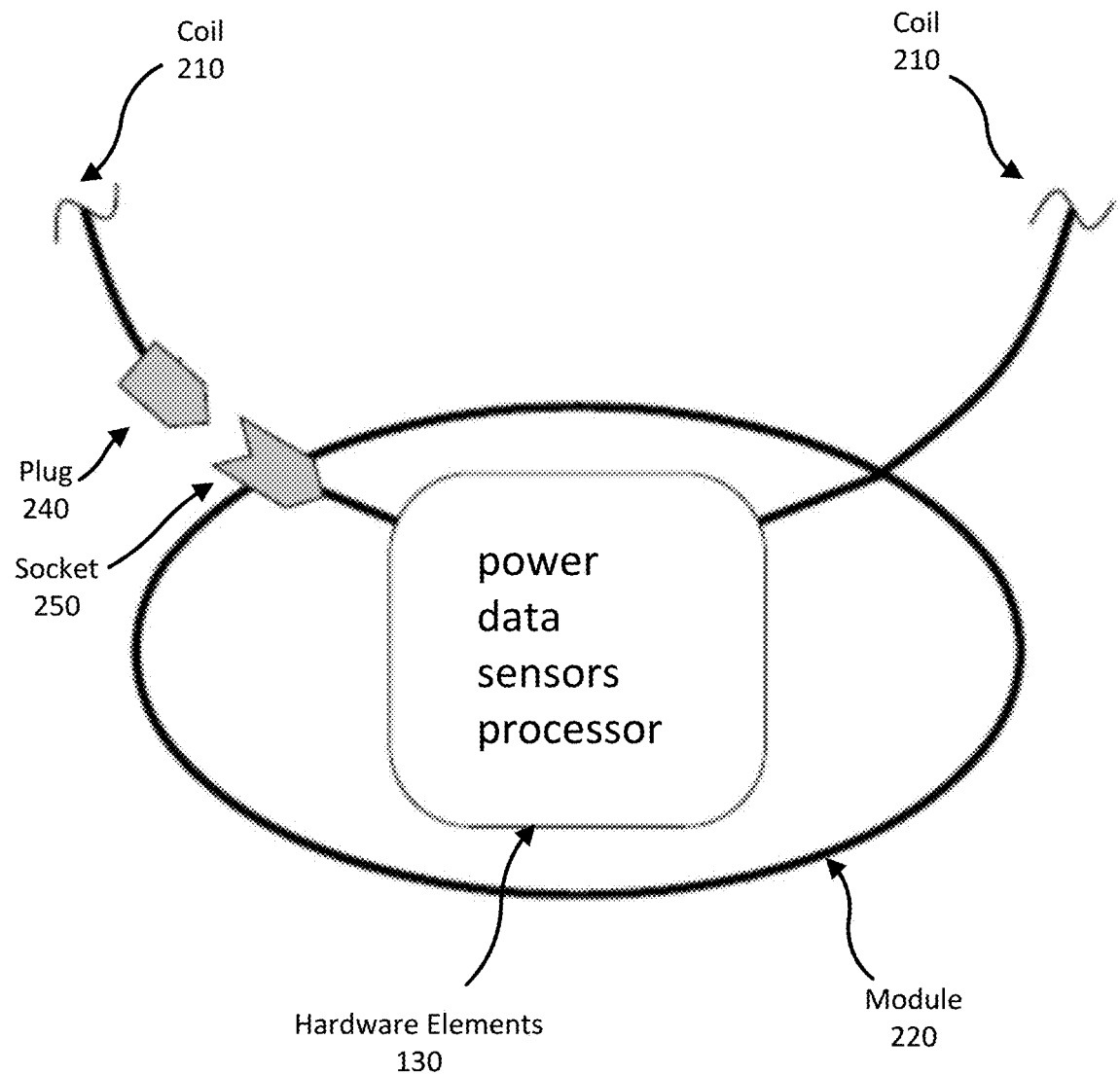
FIG. 2B shows a representation of the control electronics contained within the necklace of an augmented reality system.

FIG. 2B shows a necklace 110 of the augmented reality system 100. In the illustrated embodiment, the necklace 110 includes a module 220 that may have an exterior appearance of jewelry or a fashion accessory. However, the module 220 may contain additional hardware elements 130 such as: a power source such as a battery; a modulator to drive a radio-frequency current in the necklace coil; a data modem to encode data on the radio-frequency signal; sensors such as microphones, cameras, inertial sensors, GPS receivers, barometric pressure sensors, etc.; a cellular radio; a Wi-Fi radio; a Bluetooth radio; a graphics processing unit; and/or, a microprocessor and memory. In other configurations, the hardware elements 130 included in module 220 may be distributed about the necklace band 140.

When the hardware elements 130 produce a radio-frequency current (or any other alternating current) in the necklace coil 210, power may be inductively coupled into a coil embedded in a contact lens display 120. Data may also be transmitted to the contact lens display 120 by modulating the radio-frequency current in the necklace coil 210. Amplitude, frequency, and phase modulation are examples of modulation schemes that may be employed. For example in frequency shift keying, a pair of discrete frequencies are used to indicate logical "0" and logical "1".

The hardware elements 130 may include a microphone (or multiple microphones) to sense voices and other sounds. The wearer of an augmented reality system 100 may control the system by speaking to it, for example. The system 100 may also include hardware elements 130 such as a speaker and/or wireless connection to earphones. The system 100 may be controlled via a touch sensor in the necklace or via gestures detected by hardware elements 130 including radar (e.g. 60 GHz radar), ultrasonic and/or thermal sensors.

Additional hardware elements 130 such as inertial (acceleration and rotation rate) sensors, coupled with a barometric pressure sensor and a GPS receiver may provide position and velocity data to the AR system 100. Further, cellular radio and/or Wi-Fi radio hardware elements 130 can provide connections to voice and/or data networks. Finally, a processor, graphics processing unit and memory can run applications and store data. Broadly, the hardware elements 130 are configured to transmit data and images for projection by a contact lens display 120 onto a wearer's retina.

When the AR system 100 is connected to an external electronic device, any of the sensors, processors and other components mentioned above may be located in the electronic device. Alternatively, the hardware elements 130 of the necklace 110 may connect to an electronic device wirelessly or it may connect physically via a plug-and-socket connector or another type of connector.

Figure 3A:
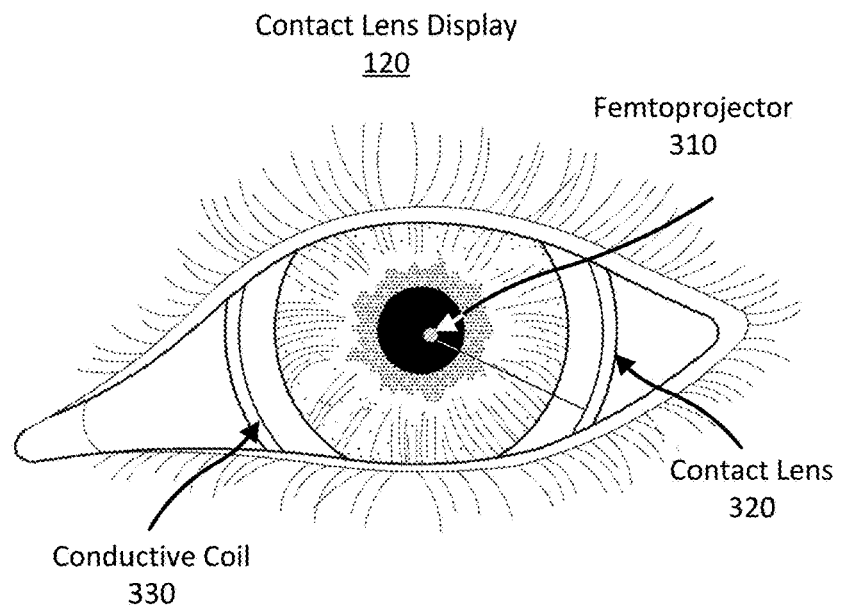
FIG. 3A shows a frontal view of a contact lens display mounted on a person's eye.

FIG. 3A shows a contact lens display 120 mounted on a person's eye. The contact lens display 120 includes a femtoprojector 310 mounted in a contact lens 320, and a conductive coil 330 near the edge of the contact lens 320 for receiving power and data wirelessly from the necklace 110 as in FIGS. 2A-2B. The femtoprojector 310 may include electronics for harvesting power from the conductive coil 330 in the contact lens 320, processing data transmitted to the contact lens 320, and driving a light emitter inside the femtoprojector 310. The femtoprojector 310 projects images on a wearer's retina.

Figure 3B:
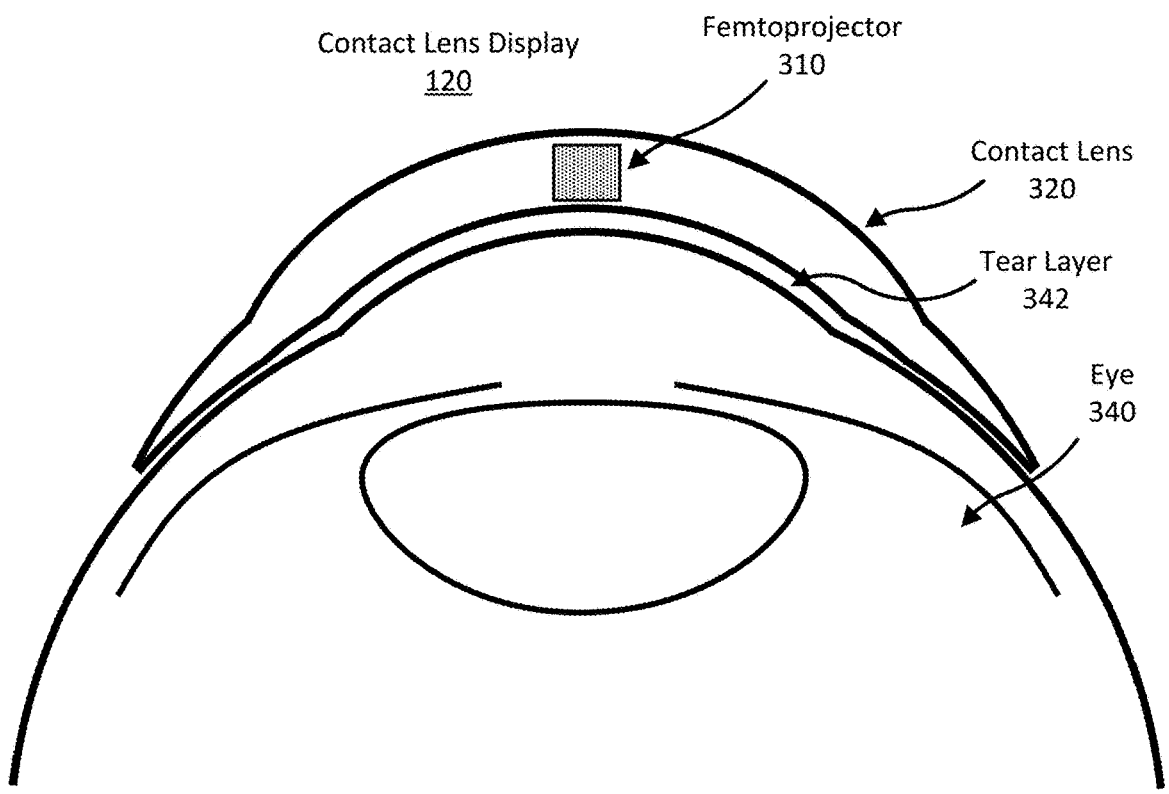
FIG. 3B shows a cross-sectional view of a contact lens display mounted on a person's eye.

FIG. 3B shows a cross-sectional view of a contact lens display 120 containing a femtoprojector 310 in a contact lens 320. FIG. 3B shows an embodiment using a scleral contact lens but the contact lens does not have to be scleral (i.e., it could be a soft contact lens). The contact lens 320 is separated from the cornea of the user's eye 340 by a tear layer 342. The contact lens display 120 has an outer surface facing away from the eye 340 and an inner surface contacting the tear layer 342. Generally, the femtoprojector 310 is positioned between the front surface and the back surface of the contact lens 320. The contact lens 320 preferably has a thickness that is less than 2 mm, and the femtoprojector 310 preferably fits in a 2 mm by 2 mm by 2 mm volume. The contact lens 320 is comfortable to wear and maintains eye health by permitting oxygen to reach the user's eye 340.

Figure 3C:
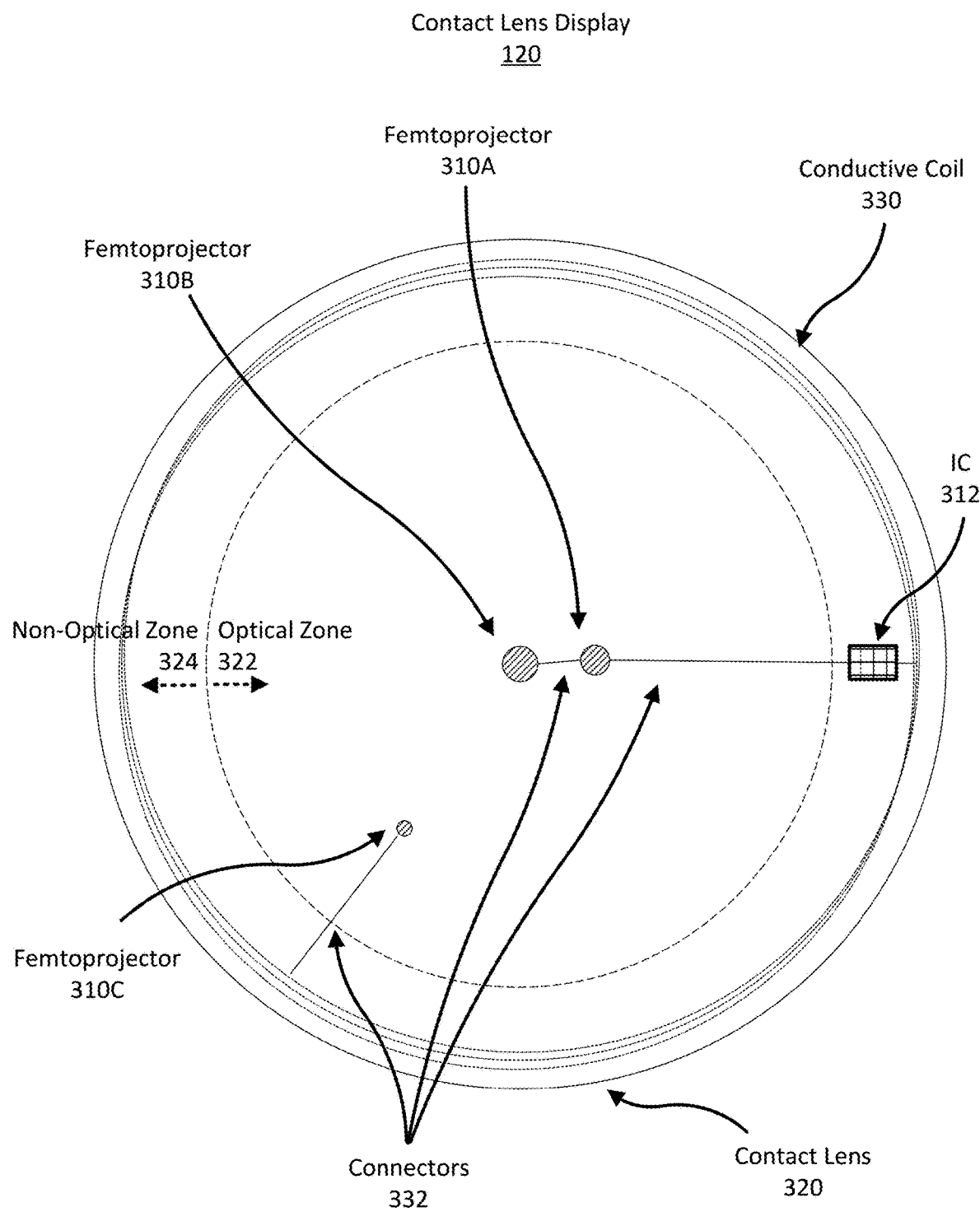
FIG. 3C shows a frontal view of the contact lens display of FIG. 3A in more detail.

FIG. 3C shows the contact lens display 120 of FIGS. 3A-3B in more detail. FIG. 3C shows a frontal view of a contact lens display 120 with multiple femtoprojectors 310A-310C in a contact lens 320. The conductive coil 330 in the contact lens 320 may have between about 1 and about 200 turns arranged in a spiral and which extend along a peripheral region of the contact lens display 120. In other configurations, the conductive coil 330 can be arranged in a cylindrical coil or any other looped shape. The conductive coil 330 is connected to the femtoprojectors 310 and other electronics via embedded connectors 332. The femtoprojectors 310 are located in a central region of the contact lens display 120 which is surrounded by the conductive coil 330. The femtoprojector 310, conductive coil 330, and electronics are enclosed in lens material such that the lens feels to a wearer like a conventional contact lens. The contact lens 320 is between about 6 mm and about 25 mm in diameter and preferably between about 8 mm and about 16 mm in diameter.

The ratio of the contact lens 320 diameter to femtoprojector 310 lateral size can be roughly 25:1 for the largest femtoprojector. This ratio is normally between about 15:1 and 30:1, but may be as small as 5:1 or as large as 50:1. FIG. 3C shows three femtoprojectors 310A-C in the contact lens 320, but many femtoprojectors, or only one, may be mounted in such a contact lens 320. Eye-mounted displays with as many as 49 femtoprojectors in a contact lens 320 have been proposed. If there is only one femtoprojector 310 in a contact lens 320, it need not be in the center of the lens.

The femtoprojectors 310 in FIG. 3C are also shown as different sizes. The entire display, made up of all the femtoprojectors 310, may be a variable resolution display that generates the resolution that each region of the eye can actually see, vastly reducing the total number of individual "display pixels" required compared to displays of equal resolution and field of view that are not eye-mounted. For example, a 400,000 pixel eye-mounted display using variable resolution can provide the same visual experience as a fixed external display containing tens of millions of discrete pixels.

In FIG. 3C, the contact lens 320 is roughly divided by the dashed circle into an optical zone 322 and a non-optical zone 324. Components in the optical zone 322 may be in the optical path of the eye 340, depending on how far open the iris is. Components in the non-optical zone 324 fall outside the aperture of the eye 340. Accordingly, active optical elements are generally positioned in the optical zone 322 and non-active optical elements are positioned in the non-optical zone 324. For example, femtoprojectors 310 are within the optical zone 322 while the conductive coil 330 is in the non-optical zone 324. Additionally, the contact lens 320 may also contain other components positioned in the non-optical zone 322 for data processing, data transmission, and power recovery and/or positioning. As an example, an integrated circuit (IC) 312 is positioned in the non-optical zone 324 and is connected to the femtoprojectors 310.

The contact lens display 120 can also include other components such as antennae or optical/infrared photodetectors, data storage and buffering, controls, and possibly also on-lens processing components. The contact lens display can include positioning components such as accelerometers and fiducial or other structures used for eye tracking and head tracking. The contact lens display 120 can also include data processing components can include a microprocessor or other data processing elements.

There are many ways in which the functions of receiving power and data and projecting the data onto the retina of a wearer can be configured with an eye-mounted display(s) to create embodiments of eye-mounted display systems. Portions of these subsystems may be external to the user, while other portions may be worn by the user in the form of a headpiece or glasses. Components may also be worn on a belt, armband, wrist piece, necklace or other types of packs. Some components may be included in external devices such as a watch, a cell-phone, a laptop, etc.

Referring back to FIG. 1, the necklace 110 may generate a time-varying magnetic field (TVMF), or any other electromagnetic field, and transmit power and/or data to the contact lens display 120 via inductive coupling. Generally, the necklace 110 is worn around a user's neck and is close proximity to the wearer's skin during operation of the AR system 100. As such, some portion of the energy generated by the necklace 110 is absorbed by the user's body rather than being transmitted to the contact lens display 120. The specific absorption rate (SAR), in this context, is a measure of the amount of energy absorbed by the user's body when using the necklace 110 of the AR system 100. More generally, SAR is a measure of the rate at which energy is absorbed by the human body when exposed to a radio frequency (RF) electromagnetic field. SAR is defined as the power absorbed per a mass of tissue and has units of watts per kilogram (W/kg). SAR can be measured as an average over the whole body or over a small sample volume (e.g., a small mass of tissue). SAR can be defined as:

$$SAR = \frac{1}{V} \int_{sample} \frac{\sigma(r)|E(r)|^2}{\rho(r)} dr \qquad (1)$$

where $\sigma$ is the sample electrical conductivity, E is the RMS electric field created by the changing magnetic field generated by the necklace, $\rho$ is the sample density (e.g., tissue density), and V is the volume of the sample (e.g., sample tissue volume). Therefore, generally, mitigating the amount of energy absorbed by the tissue (i.e., E(r)) mitigates the SAR in the human body.

In some regions of the world, governments impose safety limitations to the amount of SAR that an electronic device can impose on a human body. For example, in America, the Federal Communications Commission limits SAR generation by a cellular phone to 1.6 W/kg taken over 1 g of tissue. Similarly, governments can impose safety limitations for long term environmental exposure to RF electromagnetic fields. For example, again in America, the limit of SAR exposure for the general public is 0.08 W/kg across the body and 0.40 W/kg across the body for occupational hazards. Accordingly, necklace 110 configurations that reduce energy absorption for the wearer of the AR system 100 (i.e., mitigates the SAR) are beneficial for allowing the AR system 100 to be usable as an everyday accessory.

Figure 4:
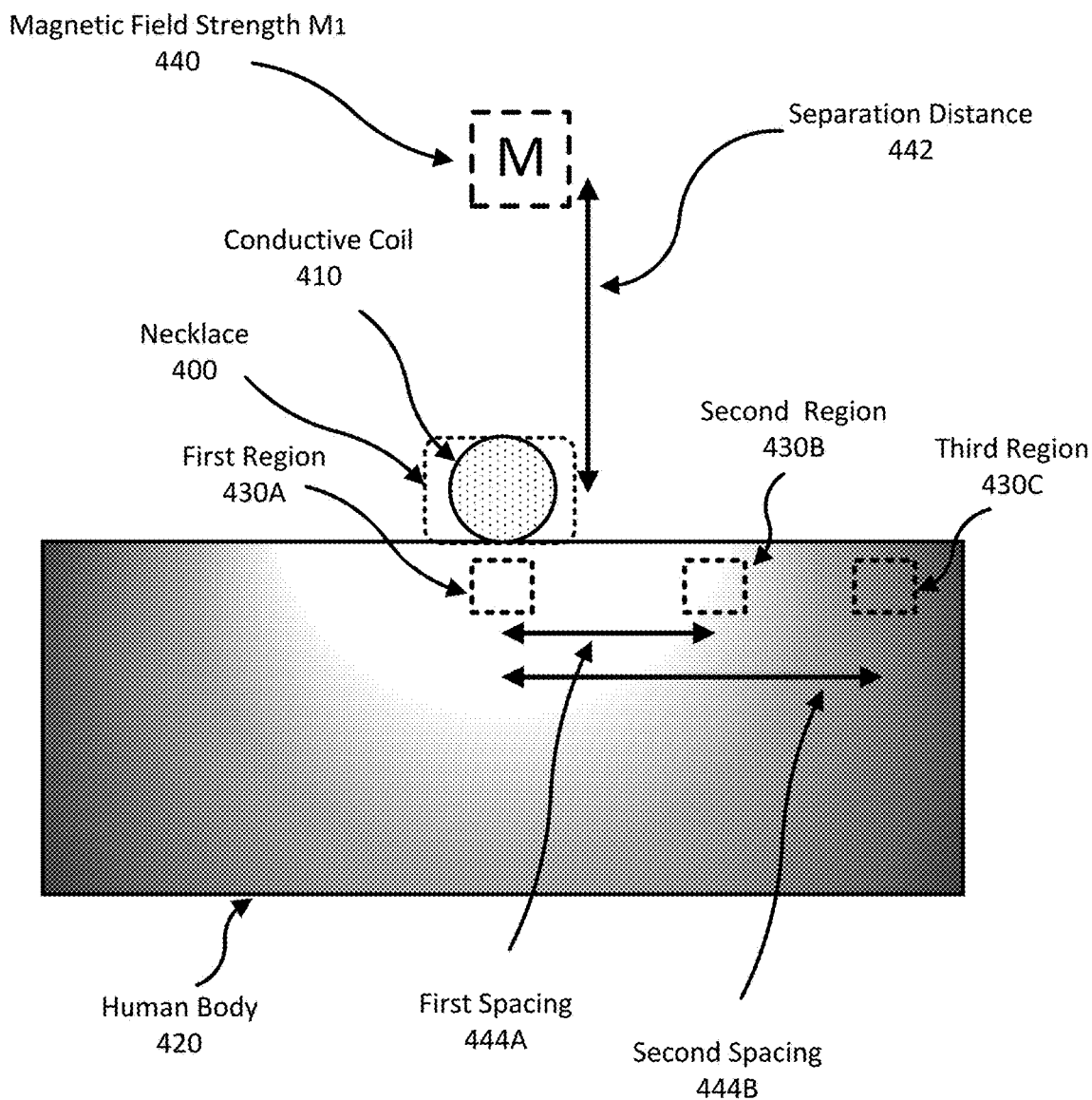
FIG. 4 is a cross-sectional illustration of a necklace including a single conductive coil on a human body and the corresponding SAR generated by the necklace while it operates as part of an AR system.

FIG. 4 is a cross-sectional illustration of a necklace 400 including a single conductive coil 410 on a human body 420 and the corresponding SAR generated by the necklace 400 while it operates as part of an AR system 100, in one example embodiment. In the illustrated example, the circle represents a cross-section of a conductive coil 410 of a necklace of an AR system 100 (i.e., the necklace 110 of FIGS. 1-3). The lower block represents a cross-section of the human body 420 underneath the necklace 400 when worn by a user of AR system 100. The variation in shading within the block represents the SAR (i.e., energy absorption) throughout the illustrated human body 420 cross-section. The magnitude of the SAR in a given region of the human body 420 is associated with the darkness of that region. Here, light shading represent high SAR (i.e., high energy absorption) and dark shading represents that low SAR (i.e., low energy absorption). As shown, the SAR is highest in a first region 430A directly underneath the point of contact between the conductive coil 410 and the human body 420. The SAR in a second region 430B of the body 420 (separated from the first region 430A by a first spacing 444A) is less than the SAR in the first region 430A. Similarly, the SAR in a third region 430C of the body 420 (separated from the first region 430A by a second spacing 444B that is greater than the first spacing 444A) is less than SAR in the first region 430A and the second region 430B. Generally, the magnitude of the SAR in the human body 420 decreases radially away from the point of contact between the conductive coil 410 and the human body 420.

In this example, the bounded M represents a point in space at a separation distance 446 at which the generated TVMF is measured with a strength $M_1$ 440. The separation distance 442 is the distance between a necklace 110 and contact lens display 120 of an AR system 100. For a typical user of the AR system 100 the separation distance 442 is approximately between 15 and 40 cm, but can be any distance between a necklace 110 and an eye 340 of the necklace wearer. In general, the necklace 110 of the AR system 100 is configured to maximize the strength 440 of the generated TVMF at a separation distance 442 while minimizing the energy absorbed by the human body 420.

Various configurations of a necklace 110 can mitigate energy absorption in the body caused by the generated TVMF. Broadly, these configurations can be divided in to two groups: a necklace 110 including multiple conductive coils 210, and a necklace 110 including a magnetic shield. Configurations of necklace 110 including multiple coils are described in regards to FIGS. 5-6H, and configurations of necklace 110 including a magnetic shield are described in FIGS. 7-8. Various other configuration of a necklace 110 for an augmented reality system 100 are described in FIGS. 9A-12E.

Figure 5A:
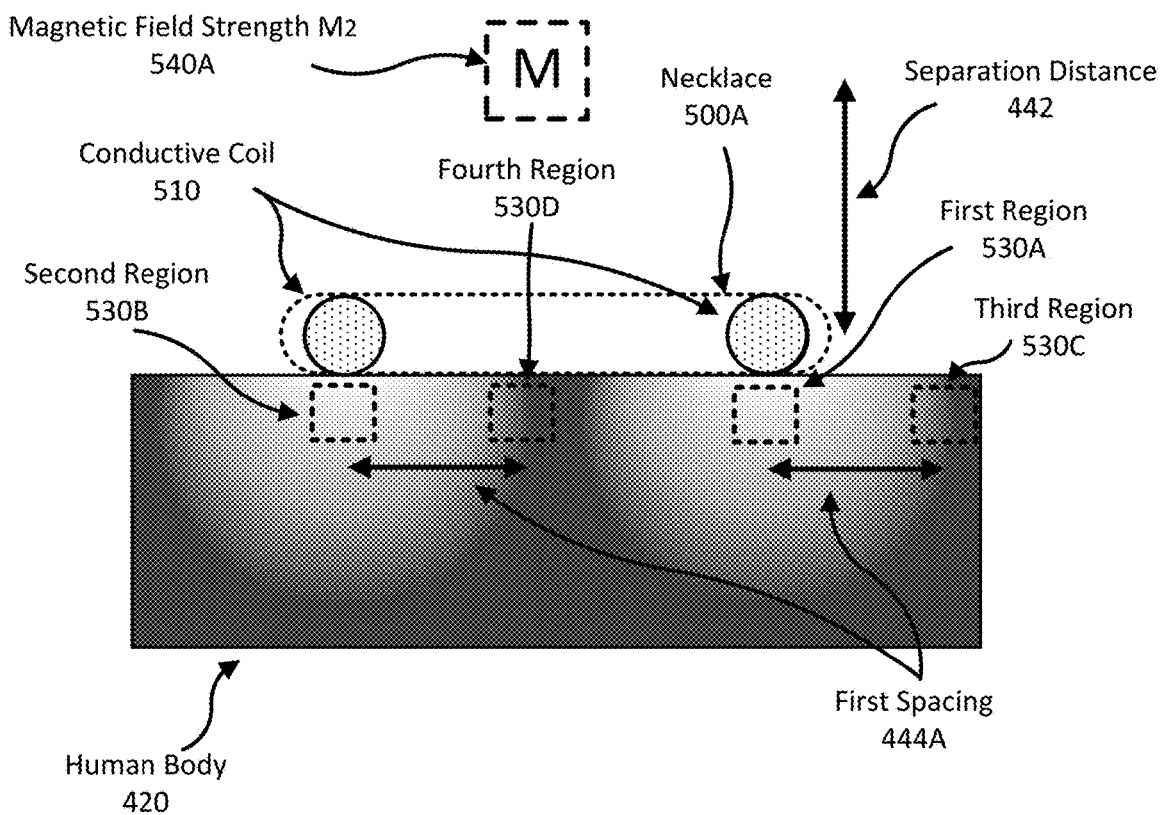
FIG. 5A is a cross-sectional illustration of a necklace including two conductive coils on a human body and the corresponding SAR generated by the necklace while it operates as part of an AR system.

FIG. 5A is a cross-sectional illustration of a necklace 500A including two conductive coils and the corresponding SAR generated by the necklace while it operates as part of an AR system 100. In this example, the necklaces of FIG. 5A and FIG. 4 are largely similar. That is, the necklaces have similar drive currents, similar cross-sections for their conductive coils, similar lengths, and are made of the same material. Additionally, FIG. 5A and FIG. 4 are illustrated in a similar area of the human body 420 such that the characteristics of the tissue in each illustration are approximately equal. However, the necklace 500A of FIG. 5A includes two conductive coils 510 (i.e., a dual-coil necklace) to carry the same amount of drive current as the single-coil necklace 400 of FIG. 4. Thus, the TVMF produced by each conductive coil 510 of the necklace 500A is weaker. Accordingly, the SAR in the body given the dual-coil necklace 500A of FIG. 5A is less than SAR in the body given the single-coil necklace 400 of FIG. 4. For example, the SAR in the first region 430A of FIG. 4 is greater than SAR in the first region 530A and second region 530B of FIG. 5A (i.e., the region directly beneath the conductive coils 510 in the human body). Similarly, the SAR in the second region 430B of FIG. 4 is greater than SAR in the third region 530C and fourth region 530D of FIG. 5A (i.e., separated from the first region 530A and the second region 530B, respectively, by a first spacing 444A).

The dual-coil necklace 500A of FIG. 5A mitigates SAR in the human body 420 while maintaining the strength of the generated TVMF. For example, the TVMF strength $M_2$ 540A in FIG. 5A is similar to the TVMF strength $M_1$ 440 in FIG. 4 at the separation distance 442. The TVMF strength $M_2$ 540A of the dual-coil necklace 500A is similar to the TVMF field strength $M_1$ 440 of single-coil necklace 400 because of constructive interference. That is, each conductive coil 510 of the dual-coil necklace 500A produces a TVMF with approximately half of the strength of the TVMF produced by the single-coil necklace 400. The two TVMFs generated by the conductive coils of the dual-coil necklace 500A constructively interfere such that the total TVMF strength is approximately equal to the TVMF strength of single coil necklace 400 at the separation distance 442 (i.e., $M_1=M_2$). However, in practice, the magnetic field strength $M_2$ 540A of a dual-coil necklace 500A can be slightly less than the magnetic field strength $M_1$ 440 of a single coil necklace 400 depending on the configuration of the necklaces.

Figure 5B:
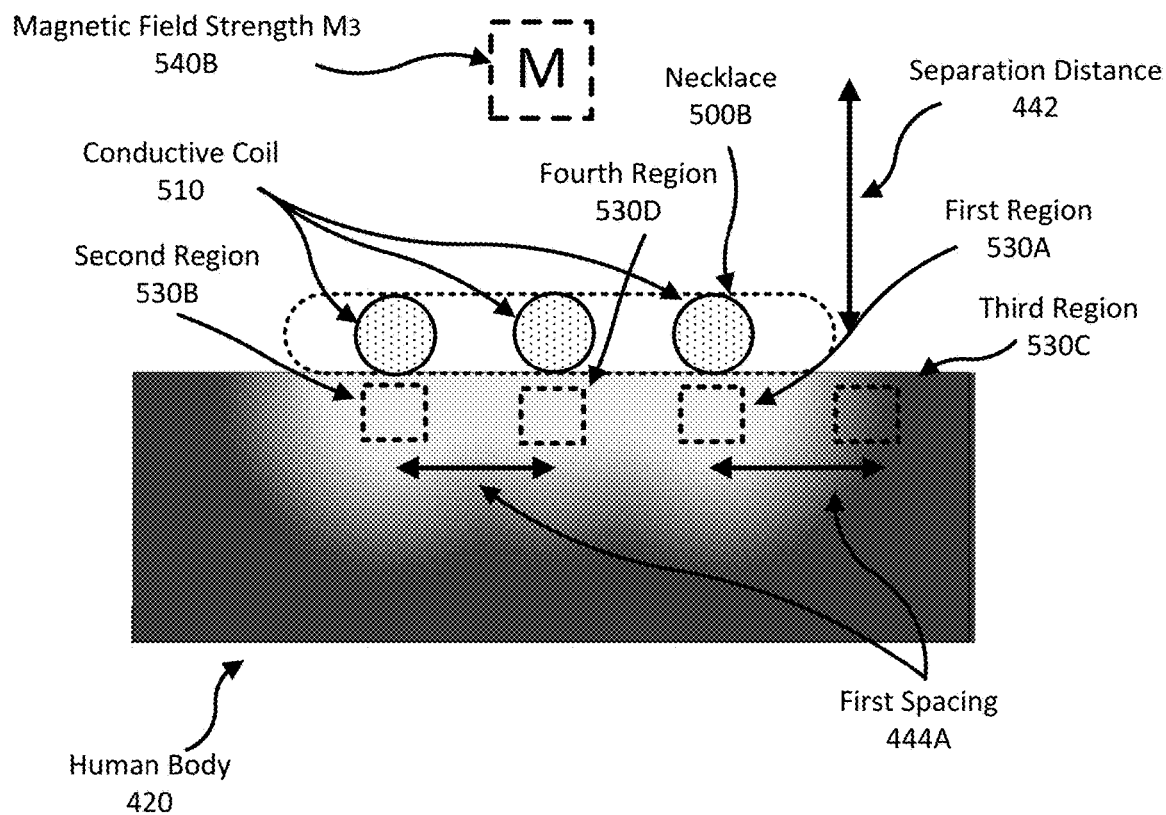
FIG. 5B is a cross-sectional illustration of a necklace including three conductive coils on a human body and the corresponding SAR generated by the necklace while it operates as part of an AR system.

FIG. 5B is a cross-sectional illustration of a necklace 500B including three conductive coils and the corresponding SAR generated by the necklace while it operates as part of an AR system 100. In this example, the necklace 500B of FIG. 5B is similar to necklace 500A of FIG. 5A except that necklace 500B includes an additional third conductive coil 510 positioned between the two conductive coils 510 of necklace 500A in FIG. 5A. The necklace 500B carries the same total amount of drive current as the necklace 500A. However, in this case, each outer conductive coil 510 carries 40% of the drive current and the inner conductive coil 510 carries 20% of the drive current rather than being split equally between the conductive coils 510 as in necklace 500A. Thus, the TVMF produced by each conductive coil 510 of the necklace 500B is weaker than the conductive coils 510 of necklace 500A. However, due to the positions of the conductive coils 510, the profile of the SAR generated in the body 420 by necklace 500B is different than the SAR generated in the body by necklace 500A. For example, the SAR in the first region 530A and second region 530B of FIG. 5A is greater than SAR in the first region 530A and second region 530B of FIG. 5B because the current in the conductive coils 510 of FIG. 5A is greater than the current in the outer conductive coils of FIG. 5B. Similarly, the SAR in the third region 530C of FIG. 5A is greater than SAR in the third region 530C of FIG. 5B. However, the SAR in the fourth region 530D of FIG. 5B is greater than the SAR in the fourth region 530D of FIG. 5A because of the TVMF generated by the additional third conductive coil. The tri-coil necklace 500B of FIG. 5B also mitigates SAR in the human body 420 while maintaining the strength $M_3$ 540B of the generated TVMF similarly to the dual-coil necklace 500A of FIG. 5A.

In other example configurations, a necklace can include additional coils to the number of coils shown in FIG. 5A and FIG. 5B (e.g., 4, 5, 6, . . . , n coils). The SAR distribution in a body is dependent on the amount of current travelling thorough each coil and the spacing between coils. Generally, increasing the number of coils and increasing the spacing between coils reduces the amount of SAR in the body. In some cases, electromagnetic simulation software may be used to determine a distribution of currents and/or spacing between coils that results in minimum SAR in a body.

Figure 6A:
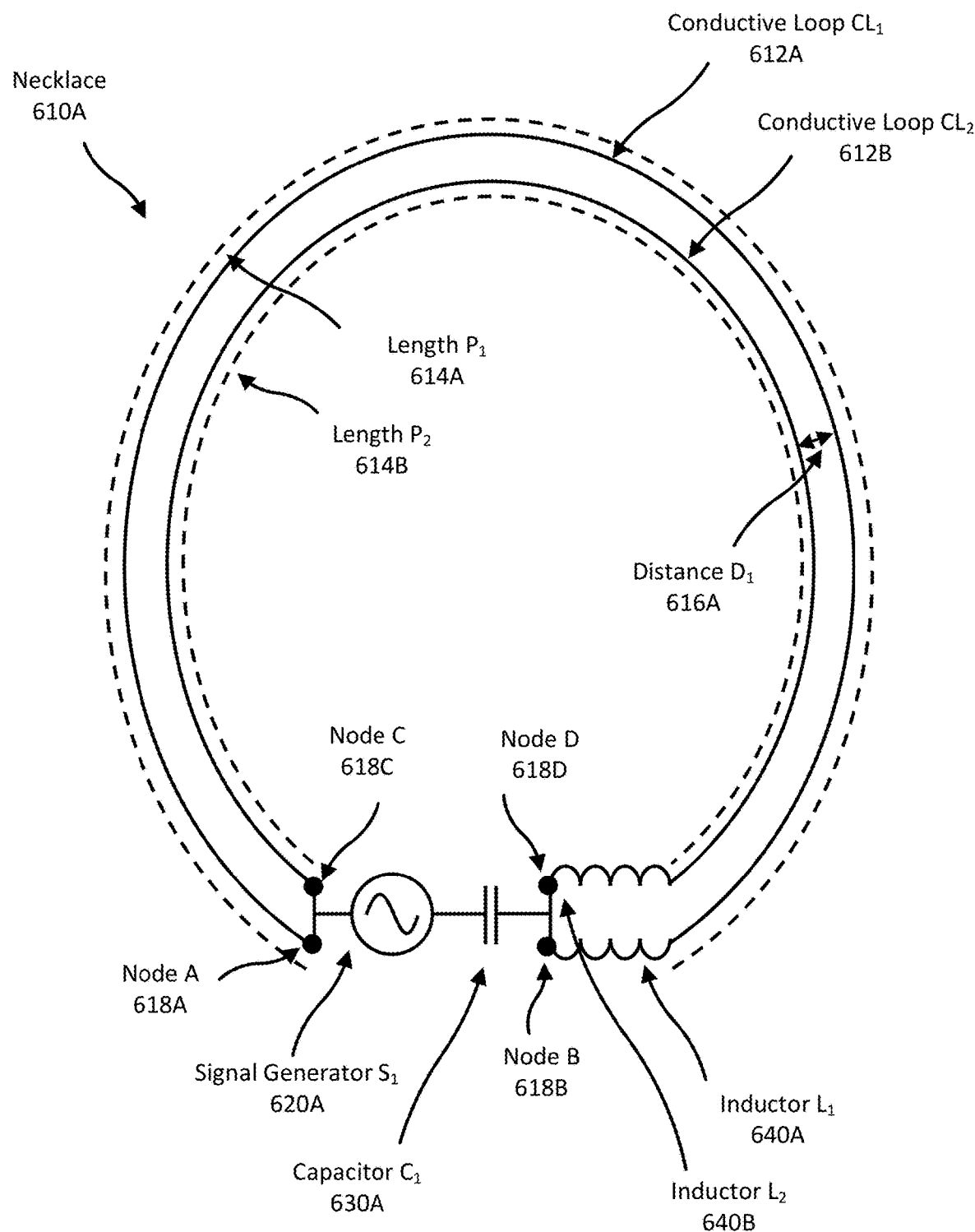
FIG. 6A is a diagram for a necklace that mitigates energy absorbed by the human body using two conductive coils driven by a single signal generator.

FIG. 6A is an illustration of a diagram 600A for a necklace 610A with multiple conductive coils to mitigate energy absorption in the human body (i.e., similar to necklace 500). In the illustrated example, necklace 610A includes a conductive loop $CL_1$ 612A and a conductive loop $CL_2$ 614B that are concentric and spaced apart from each other. Here, both conductive loops 612 extend along the band (e.g., band 140) of necklace 610A. In this example, necklace 610A only shows a single turn of each conductive loop 612, however, the illustrated conductive loops 612 can include any number of turns and form a conductive coil (e.g., conductive coil 210). The conductive loops 612 can be made from any conductive material such as silver, copper, or aluminum wire, etc.

Conductive loop $CL_1$ 612A has length $P_1$ (represented by dashed line 614A), conductive loop $CL_2$ has length $P_2$ (represented by dashed line 614B), and the two conductive loops 612 are separated by distance $D_1$ 616A. Lengths $P_1$ 614A and $P_2$ 614B are illustrated for context. Here, lengths 614 of conductive loops 612 represent the length (or path, perimeter, etc.) of the conducive loop along the band of necklace 610A. In this example, the lengths 614 are illustrated as arcs, but can take any number of shapes including a circle, an oval, or any other continuous curved or looped shape.

Generally, conductive loop $CL_2$ 612B has a shorter length $P_2$ 614B than length $P_1$ 614A of conductive loop $CL_1$ 612A (i.e., $P_2<P_1$). Conductive loop $CL_2$ 612B is thus smaller than and also located inside of conductive loop $CL_1$ 612A. Conductive loop $CL_2$ 612B is separated from conductive loop $CL_1$ 612A by distance $D_1$ 616A such that conductive loop $CL_2$ 612B is approximately located along the inner edge of the band of necklace 610A and conductive loop $CL_1$ 612A is approximately located along the outer edge of the band of necklace 610A. Alternatively described, if necklace 610A lies flat on a plane, conductive loops 612 are concentric about a center point along the band of necklace 610A with conductive loop $CL_2$ 612B nearer the center point than conductive loop $CL_1$ 612A. In a configuration where the conductive loops 612 are circular, conductive loop $CL_1$ 612A has a radius greater than the radius of conductive loop $CL_2$ 612B.

Necklace 610A includes hardware components (e.g., hardware elements 130) configured to generate a TVMF to inductively couple necklace 610A to contact lens display 120 for power transmission. In the illustrated example, necklace 610A includes signal generator $S_1$ 620A (i.e., a time varying current or voltage source) connected in series with capacitor $C_1$ 630A. Capacitor $C_1$ 630A is connected in series to a first end of a pair of inductive branches that are connected in parallel. The second end (i.e., the opposite end) of the pair of inductive branches is connected in series with signal generator $S_1$ 620A.

In the illustrated embodiment, the first inductive branch includes all components connected between Node A 618A and Node B 618B along length $P_1$ 614A and the second inductive branch includes all components connected between Node C 618C and Node D 618D along length $P_2$ 614B. Here, the first inductive branch includes inductor $L_1$ 640A connected in series to conductive loop $CL_1$ 612A and the second inductive branch includes inductor $L_2$ 640B connected in series to conductive coil $CL_2$ 612B. More generally, an inductive branch includes any elements connected in series along the band of a necklace (e.g., band 140 of necklace 110) and any number of inductive branches can be coupled in parallel. Conductive loop $CL_1$ 612A and conductive loop $CL_2$ 612B have an inherent loop inductance $L_{CL1}$ and $L_{CL2}$ and mutual inductance $L_M$, respectively. Inherent loop inductances are based on any of each conductive loop's 612 length 614, diameter (e.g., cross-section), number of turns, material, etc. Mutual inductances are based on the inherent loop inductance $L_{CL}$, magnetic coupling between loops and TVMF. The first inductive branch has a combined inductance $L_{EQ1}$ based on loop inductor $L_1$ 640A, loop inductance $L_{CL1}$, and mutual inductance $L_M$. The second inductive branch has a combined inductance $L_{EQ2}$ based on the inductor $L_2$ 640B, inherent loop inductance $L_{CL2}$, and the mutual inductance $L_M$. Similarly, the first and second inductive branches have an impedance $Z_1$ and $Z_2$ based on the resistance and reactance of each inductive branch, respectively. Generally, the inductors $L_1$ 640A and $L_2$ 640B are selected such that the impedance $Z_1$ and $Z_2$ of the inductive branches are substantially similar (i.e., within 10% of one another).

Conductive loops 612 convert time-varying current into a TVMF field as the current passes through the loops 612. The TVMF can provide power to an inductively coupled contact lens display (e.g., contact lens display 120). In this example, signal generator $S_1$ 620A generates a time-varying AC current (i.e., drive current) to drive capacitor $C_1$ 630A, inductors $L_1$ 640A and $L_2$ 640B, and conductive loops $CL_1$ 612A and $CL_2$ 612B to generate the TVMF. The drive current is divided between the two parallel inductive branches based on a ratio of impedances $Z_1$ and $Z_2$. In a configuration where the impedances of each conductive loop 612 are substantially similar (i.e., $Z_1 \approx Z_2$), the drive current is divided between the two inductive branches equally. For each inductive branch, drive current travelling through the conductive loop 612 generates a TVMF. Accordingly, some portion of the generated TVMF energy is absorbed by the human body (as illustrated in FIG. 5A). The amount of energy absorbed by the body from necklace 610A with two conductive loops is less than amount of energy absorbed by the body in a necklace including a single conductive loop (assuming similar drive current and conductive loop characteristics). That is, the SAR of a dual-coil necklace is less than a single coil necklace. Further, the distance $D_1$ 616A can be configured to mitigate the energy absorbed by a specific region of the wearer's body 420. Generally, increasing the distance $D_1$ 616A between the conductive loops 612 of the inductive branches can mitigate the energy absorbed by a region of the wearer's body. That is, as the distance $D_1$ 616A decreases and the conductive loops 612 move closer together, the energy absorbed by the human body becomes similar to a single-coil necklace.

Additionally, conductive loops $CL_1$ 612A and $CL_2$ 612B, inductors $L_1$ 640A and $L_2$ 640B, capacitor $C_1$ 630A, and the drive current generated by signal generator $S_1$ 620A can be configured such that the necklace 610A generates magnetic fields which constructively interfere. The constructively interfering magnetic fields have a magnetic field strength similar to the magnetic field strength produced by a single conductive loop at a separation distance (i.e., separation distance 442). Thus, necklace 610A may transmit power to a contact lens display 120 with a similar efficiency as a necklace with a single conductive coil while the body 420 of the wearer absorbs less energy from the generated TVMF.

Necklace 610A with two conductive loops 612 is only a single example of a necklace 110 with multiple loops that mitigates energy absorption in the human body. In various other multi-loop configurations, a necklace 110 can include any number of conductive loops 612, inductors 640, capacitors 630, and signal generators 620, coupled in any of a variety of manners.

Figure 6B:
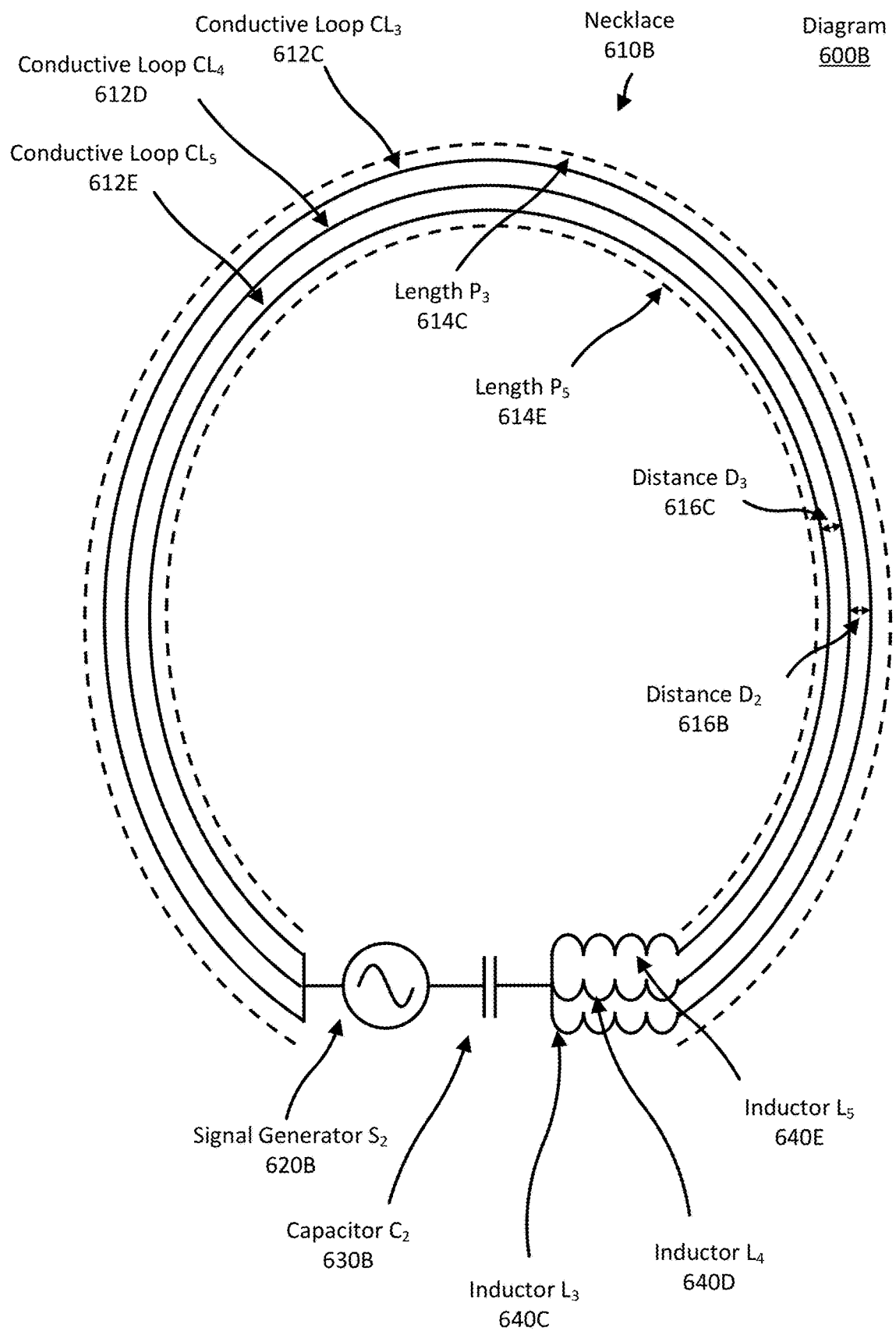
FIG. 6B is a diagram for a necklace that mitigates energy absorbed by the human body using three conductive coils driven by a single signal generator.

For example, FIG. 6B is an illustration of a diagram 600B for a necklace 610B with multiple loops to mitigate energy absorbed by the human body, according to one example embodiment. The necklace 610B of FIG. 6B is largely similar to necklace 610A of FIG. 6A, but includes three concentric conductive loops (e.g., conductive loops $CL_3$ 612C, $CL_4$ 612D, and $CL_5$ 612E) instead of two loops. The conductive loops 612 have length $P_3$ 614C, length $P_4$ (not shown for clarity), and length $P_5$ 614E, respectively, along the band of the necklace 610B. Length $P_3$ 614C is greater than length $P_4$ and length $P_5$ 615E, and length $P_4$ is greater than length $P_5$ 614E. Conductive loop $CL_3$ 612C is separated from conductive loop $CL_4$ by distance $D_2$ 616B, and conductive loop $CL_4$ 612D is separated from conductive loop $CL_5$ 612E by distance $D_3$ 616C. Distance $D_2$ 616B can be the same or different than distance $D_3$ 616C In general, length $P_3$ 614C is longest because it lies on the outside edge of the necklace 610B band and length $P_5$ 614E is the shortest because it lies on the inside edge of the necklace 610B band. Length $P_4$ is between lengths $P_3$ 614C and $P_5$ 614E because it lies along the middle of the necklace band. Alternatively stated, when on a single plane, the conductive loops 612 are concentric about a center point, with conductive loop $CL_5$ 612E nearer the center than conductive loop $CL_4$ 612D, and the conductive loop $CL_4$ 612D nearer the center than conductive loop $CL_3$ 612C. When all conductive loops 612 are circular, conductive loop $CL_3$ 612C has a radius greater than conductive loop $CL_4$ 612D, and conductive loop $CL_4$ 612D has a radius greater than conductive loop $CL_5$ 612E.

Necklace 610B includes hardware components configured to generate a TVMF to inductively couple necklace 610B to a contact lens display 120 for power transmission. In this configuration, necklace 610B includes signal generator $S_2$ 620B connected in series with capacitor $C_2$ 630B. Capacitor $C_2$ 630B is coupled in series to a first end of a trio of inductive branches that are connected in parallel. The second end of the trio of inductive branches is connected in series with signal generator $S_2$ 620B. While only two and three branch necklace configurations are illustrated herein, any number of similar branching configurations including any number of conductive loops (i.e., 4, 5, 6, . . . n) is possible.

Again, each inductive branch includes all hardware elements connected along a length P of the band of necklace 610B similar to necklace 610A of FIG. 6A. For example, each inductive branch includes an inductor $L_3$ 640C, $L_4$ 640D, and $L_5$ 640E connected in series with conductive loop $CL_3$ 612C, $CL_4$ 612D, and $CL_5$ 612E, respectively. Conductive loops $CL_3$ 612C, $CL_4$ 612D, and $CL_5$ 612E, have mutual inductance $L_M$, and inherent loop inductances $L_{CL3}$, $L_{CL4}$, and $L_{CL5}$, and respectively. Each inductive branch has a combined inductance $L_{EQ3}$, $L_{EQ4}$, and $L_{EQ5}$, respectively, based on the inductors $L_3$ 640C, $L_4$ 640D, and $L_5$ 640E, the mutual inductance $L_M$, and the inherent loop inductances $L_{CL3}$, $L_{CL4}$, and $L_{CL5}$, respectively. Similarly, the inductive branches have impedances $Z_3$, $Z_4$, and $Z_5$ based on the resistance and reactance of each inductive branch, respectively.

Signal generator $S_2$ 620B generates an AC current (i.e., drive current) to drive the capacitor $C_2$ 630B, inductors 640, and conductive loops 612 of necklace 610B. Here, signal generator 620B generates a similar drive current to signal generator 620A (i.e., an electrical signal or current having the same frequency as signal generator 620A) and the drive current is split between three inductive branches. In a first example, the drive current is divided equally between the three parallel inductive branches based on a ratio between impedances $Z_3$, $Z_4$, and $Z_5$ is 1:1:1 (assuming $Z_3 \approx Z_4 \approx Z_5$). In other examples, the drive current is not equally divided between the three parallel inductive branches because the ratio between impedances is $Z_3$, $Z_4$, and $Z_5$ is not 1:1:1 (for example, 1:2:1, 2:1:2, 1:2:3, etc.). Drive current travelling through the conductive loops 612 generates a TVMF and the TVMF produces SAR in the human body 420. In both examples, the SAR produced by necklace 610B having three conductive loops is less than the SAR produced by necklace 610A having two conductive loops, but the profile of the SAR in the body is dependent on the drive current travelling through each conductive loop.

The aggregate strength of TVMFs produced by the conductive loops 612 of necklace 610B is similar to the strength of the aggregate strength of TVMFs produced by conductive loops of necklace 610A when measured at a separation distance 442. Thus, necklace 610B may transmit power to a contact lens display 120 with a similar efficiency as a necklace with a one or two conductive loops while producing less SAR in the body. Generally, increasing the number of conductive loops 612 connected to a signal generator 620 in a parallel configuration mitigates the amount of SAR in the human body but can still maintain the magnetic field strength at a separation distance 442.

In some cases, it can be beneficial to generate an independent drive current for each conductive loop of a multi-loop necklace. Independent drive currents can allow for a greater amount of control in generating TVMF that produce high magnetic field strengths at a separation distance 442. For example, FIG. 6C illustrates a diagram 600C for a necklace 610C with multiple independently driven conductive loops to mitigate energy absorbed in the human body, according to some example embodiments.

Figure 6C:
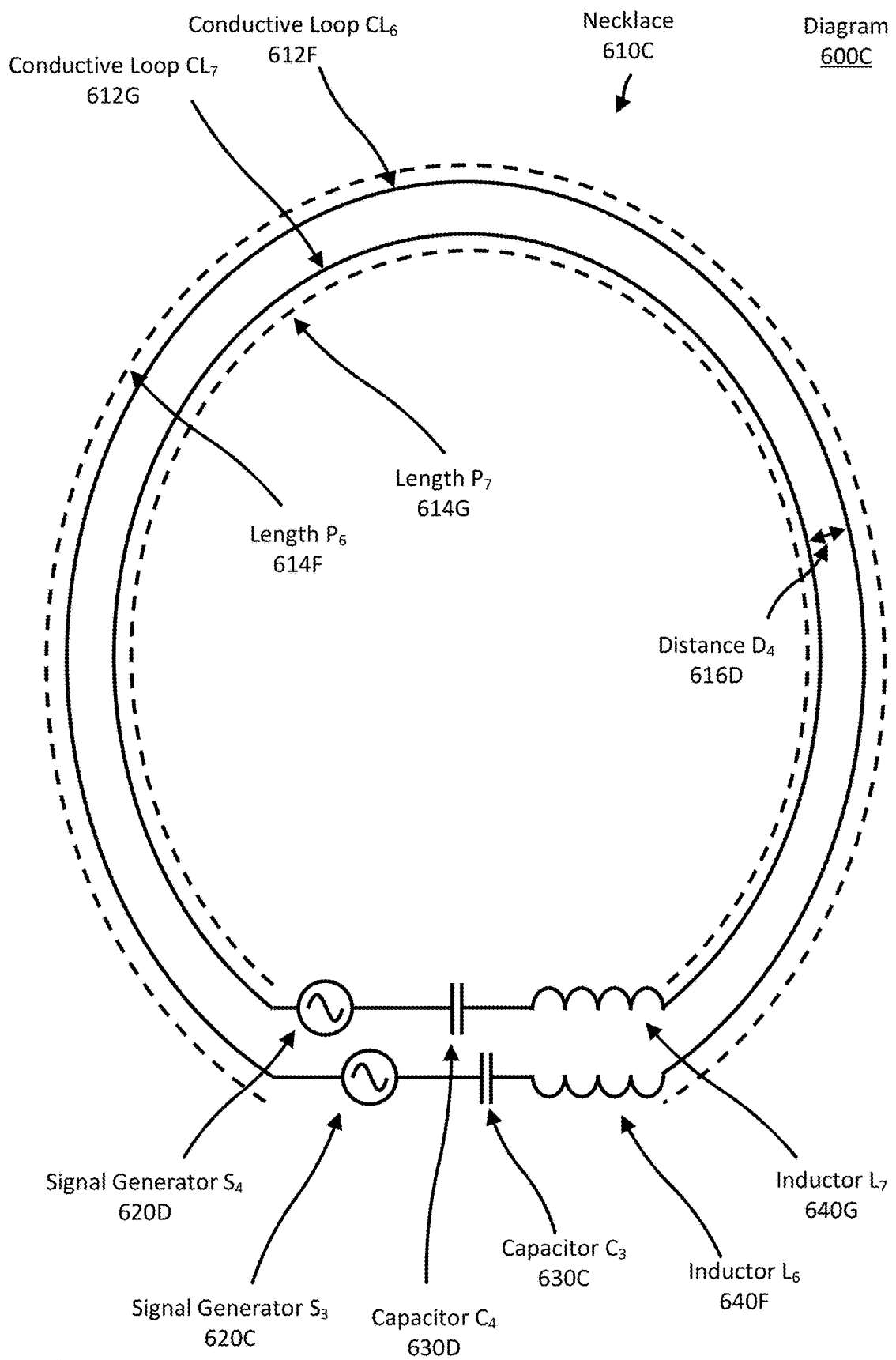
FIG. 6C is a diagram for a necklace that mitigates energy absorbed by the human body using two conductive coils, with each coil independently driven by a signal generator.

FIG. 6C is a necklace 610C including two conductive loops $CL_6$ 612F and $CL_7$ 612G having lengths $P_6$ 614F and $P_7$ 614G, respectively, two inductors $L_6$ 640F and $L_7$ 640G, two capacitors $C_3$ 630C and $C_4$ 630D, and two signal generators $S_3$ 620C and $S_4$ 620D. In this example embodiment, conductive loop $CL_6$, inductor $L_6$ 640F, signal generator $S_3$ 620C, and capacitor $C_3$ 630C are all connected in series about the band of the necklace 610C (i.e., the outer loop circuit). Similarly, conductive loop $CL_7$ 612G, inductor $L_7$ 640G, signal generator $S_4$ 620D, and capacitor $C_4$ 630D are all connected in series about the band of the necklace 610C (i.e., the inner loop circuit). Each conductive loop 612 has a mutual inductance $L_M$, an inherent inductance $L_{CL6}$ and $L_{CL7}$, respectively. The conductive loops 612F and 612G are separated by distance $D_4$ 616D, and the outer loop 612F has a length $P_6$ 614F greater than the length $P_7$ 614G of the inner loop 612G. The outer loop circuit and the inner loop circuit have an impedance $Z_6$ and $Z_7$, respectively.

In the illustrated embodiment, signal generator $S_3$ 620C generates a first AC signal (i.e., a first drive current) for the outer loop circuit and signal generator $S_4$ 620D generates a second AC signal (i.e., a second drive circuit) for the inner loop circuit. The inner and outer loop circuits each generate a TVMF and the energy can be absorbed by the body 420. As each loop circuit is independently controlled, the TVMF produced by each circuit can be individually controlled. In this case, the impedances of the loop circuits need not be substantially similar. The drive currents can be controlled such that, in aggregate, the TVMF strength at a separation distance 442 of necklace 610C is similar to the TVMF strength at a separation distance 442 for a single loop necklace. Additionally, the drive currents can be controlled such that energy absorbed by human body given necklace 610C is less than the energy absorbed by human body given by a single loop necklace.

Figure 6D:
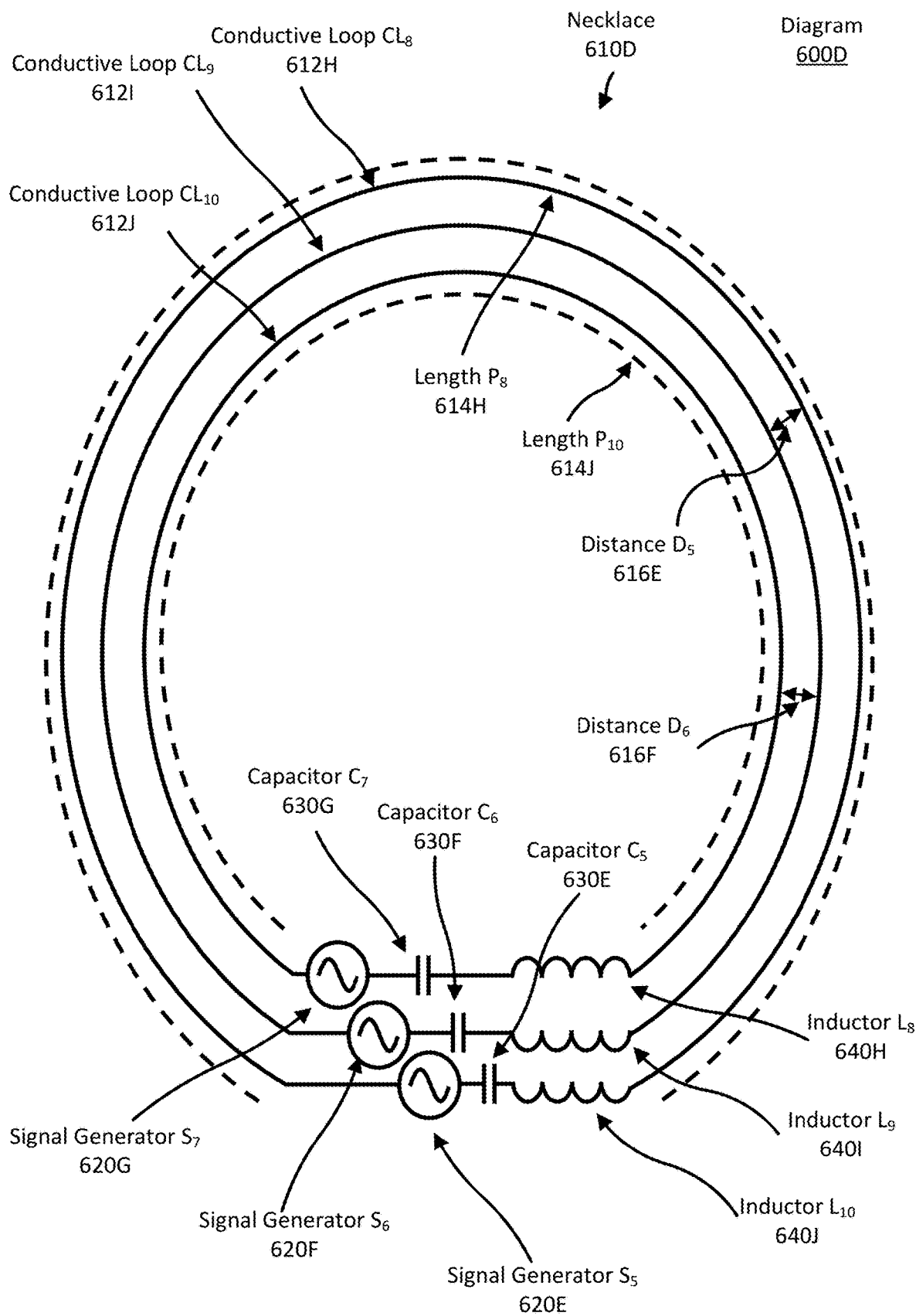
FIG. 6D is a diagram for a necklace that mitigates energy absorbed by the human body using three conductive coils, with each coil independently driven by a signal generator.

FIG. 6C illustrates two independently driven conductive loops, but in other embodiments there can any number of independently driven conductive loops (i.e., 3, 4, 5, . . . n). For example, FIG. 6D is a diagram 600D for a necklace 610D that includes three loop circuits (i.e., an inner loop circuit, a center loop circuit, and an outer loop circuit) each loop circuit with a conductive loop 612, inductor 640, capacitor 630, and signal generator 620. More specifically, the necklace 610D includes an outer loop circuit including signal generator $S_5$ 620E, capacitor $C_5$ 630E, inductor $L_8$ 640H, and conductive loop $CL_8$ 612H having length $P_8$ 612H; a center loop circuit including signal generator $S_6$ 620F, capacitor $C_6$ 630F, inductor $L_9$ 640I, and conductive loop $CL_9$ 612I having length $P_9$ (not pictured, for clarity); and an inner loop circuit including signal generator $S_7$ 620G, capacitor $C_7$ 630G, inductor $L_{10}$ 640J and conductive loop $CL_{10}$ 612J. Each conductive loop 612 has a mutual inductance $L_M$, and an inherent inductance $L_{CL8}$, $L_{CL9}$, and $L_{CL10}$, respectively. Each loop circuit has impedance $Z_8$, $Z_9$, and $Z_{10}$, respectively. Length $P_8$ 612H is longer than length $P_9$ and $P_{10}$ 614J, and length $P_9$ is longer than length $P_{10}$ 614J. In the example of FIG. 6D, each loop circuit is independently driven by a signal generator to generate magnetic fields that, in aggregate, produce a magnetic field strength similar to a single coil necklace (e.g., necklace 610A) at a separation distance 442 while reducing energy absorbed by the human body relative to energy absorbed by the human body from a single coil necklace.

Figure 6E:
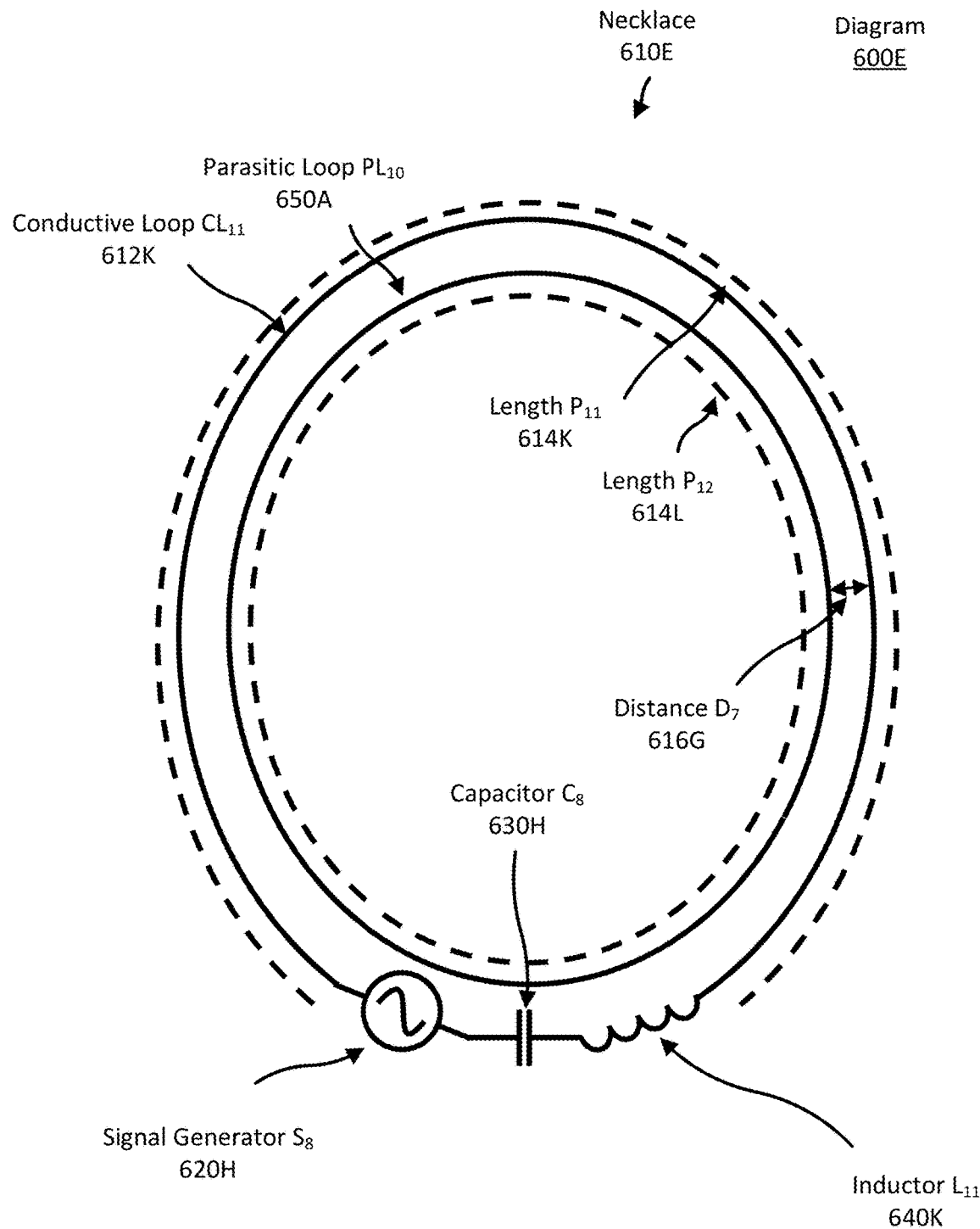
FIG. 6E is a diagram for a necklace that mitigates energy absorbed by the human body using a conductive coil and a parasitic coil, the conductive coil driven by a signal generator and the parasitic coil being undriven.

In another embodiment, a multi-coil necklace can include a coil that is not driven by a signal generator (i.e., a parasitic coil). The parasitic coil can be inductively coupled to the conductive coils of the necklace. FIG. 6E is a diagram 600E of a necklace 610E that includes a parasitic coil (i.e., parasitic loop $PL_1$ 650A). In this embodiment, necklace 610E includes a loop circuit having a signal generator $S_8$ 620H, an outer conductive loop $CL_{11}$ 612K with length $P_{11}$ 614K, inductor $L_{11}$ 640K, and capacitor $C_8$ 630H connected in series. The conductive loop $CL_{11}$ 612K has a mutual inductance $L_M$ and an inherent inductance $L_{EQ11}$. Necklace 610E also includes a parasitic loop $PL_1$ 650A with length $P_{12}$ 614L. In this embodiment, length $P_{12}$ 614L of parasitic loop $PL_1$ 650A is shorter than length $P_{11}$ 614K of conductive loop $CL_{11}$ 612K because parasitic loop $PL_1$ 650A is along the inner edge of the necklace 610E band and conductive loop $CL_{11}$ 612K is along the outer edge of the necklace 610E band. The conductive loop $CL_{11}$ 612K is concentric with the parasitic loop 650A and separated from the parasitic loop 650A by a distance $D_7$ 616G. The parasitic loop 650A can be floating and is not actively driven.

In this embodiment, signal generator $S_8$ 620H generates an AC current (i.e. drive current) which is converted by the conductive loop $CL_{11}$ 612K into a TVMF. Lenz's law dictates that the TVMF generated by the loop circuit induces a time-varying current in parasitic loop $PL_1$ 650A (i.e., parasitic current) because parasitic loop $PL_1$ 650A is inductively coupled to conductive loop $CL_{11}$ 612K. The parasitic current is in the opposite direction of the drive current. Therefore, parasitic loop $PL_1$ 650A generates a TVMF that is in the opposite direction of the TVMF generated by the loop circuit. The TVMF generated by the parasitic loop $PL_1$ 650A destructively interferes with the TVMF generated by the loop circuit. Accordingly, the energy absorbed in the human body 420 due to the destructively interfering TVMFs is less than the energy absorbed by the human body from a necklace including a single conductive coil.

Figure 6F:
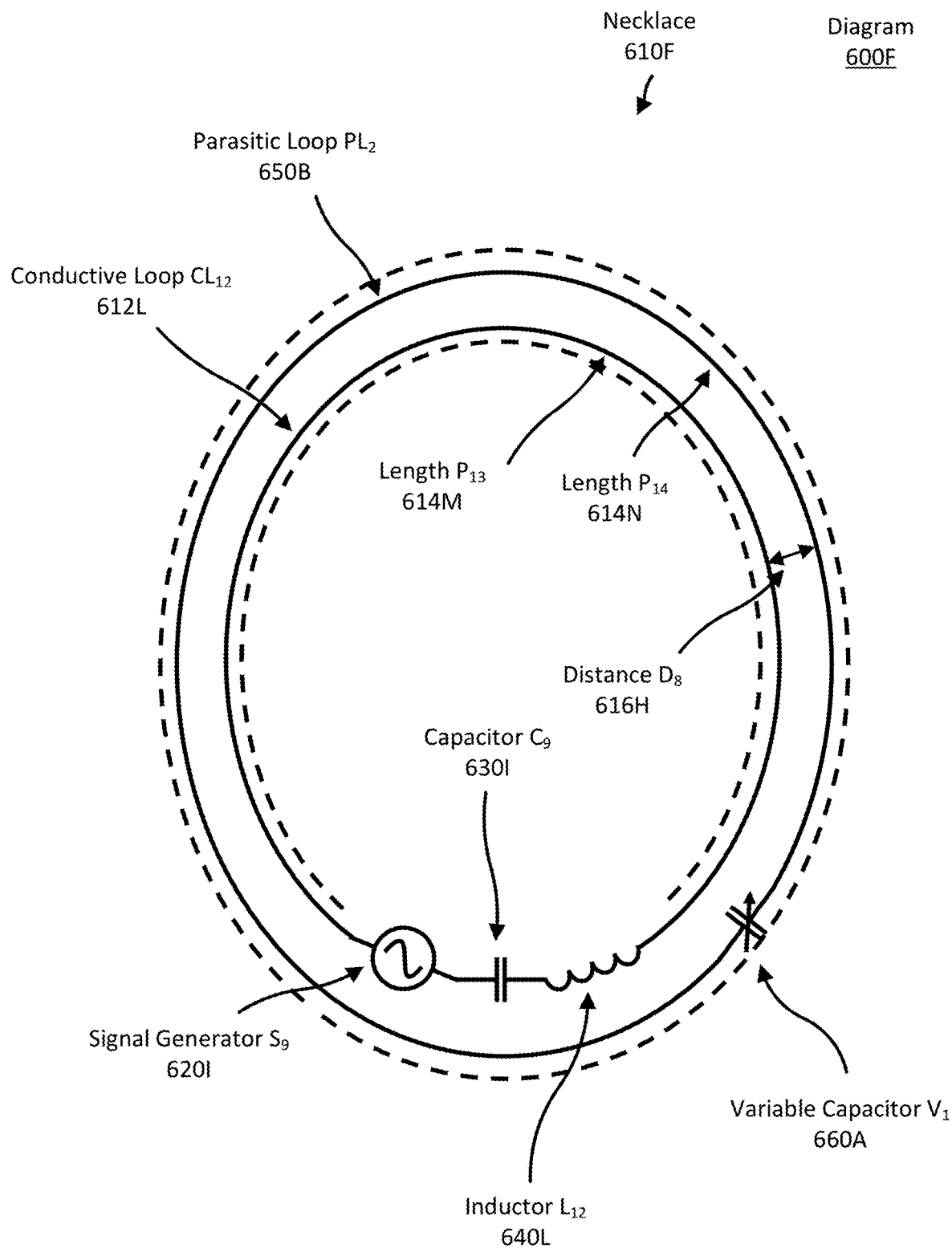
FIG. 6F is a diagram for a necklace that mitigates energy absorbed by the human body using a conductive coil and a parasitic coil, the conductive coil driven by a signal generator and the parasitic coil being undriven but including a variable capacitor.

In various embodiments, a parasitic coil can be configured in a variety of manners. For example, FIG. 6F is a diagram 600F of a necklace 610F including a parasitic coil with a variable capacitor $CV_1$ 660A. In this embodiment, necklace 610F includes a loop circuit having a signal generator $S_9$ 620I, a conductive loop $CL_{12}$ 612L with length $P_{13}$ 614M, inductor $L_{12}$ 640L, and capacitor $C_9$ 630I connected in series. The conductive loop $CL_{12}$ 612L has a mutual inductance $L_M$, and an inherent inductance $L_{EQ1}$ 2. Necklace 610E also includes parasitic loop $PL_2$ 650B with length $P_{14}$ 614N and which is coupled in series with a variable capacitor $V_1$ 660A. In this embodiment, length $P_{14}$ 614N is longer than length $P_{13}$ 614M because parasitic loop $PL_2$ 650B is along the outer edge of the necklace 610E band and conductive loop $CL_{12}$ 612L is along the inner edge of the necklace 610E band. The conductive loop $CL_{12}$ 612L is concentric with the parasitic loop $PL_2$ 650B and separated from the parasitic loop $PL_2$ 650B by a distance $D_8$ 616H.

In this embodiment, signal generator $S_9$ 620I generates an AC current (i.e. drive current) which is converted by the conductive loop $CL_{12}$ 612L into a TVMF. A parasitic current is induced in the parasitic loop $PL_2$ 650B by the TVMF. The parasitic current generates a TVMF in the opposite direction than the TVMF generated by the loop circuit. The parasitic loop $PL_2$ 650B and variable capacitor $V_1$ 660A form a resonant circuit having a resonant frequency. Variable capacitor $V_1$ 660A can be configured to change the characteristics of the circuit such that it's generated TVMF opposes the TVMF generated by the loop circuit by a variable amount. That is, changing the capacitance of the variable capacitor $V_1$ 660A can result in an increase or decrease in the amount of destructive interference caused by TVMF from the parasitic loop $PL_2$ 650B. The energy absorbed by the human body 420 due to the destructively interfering magnetic fields of necklace 610F is less than the SAR produced in the human body from a necklace including a single conductive coil.

Figure 7:
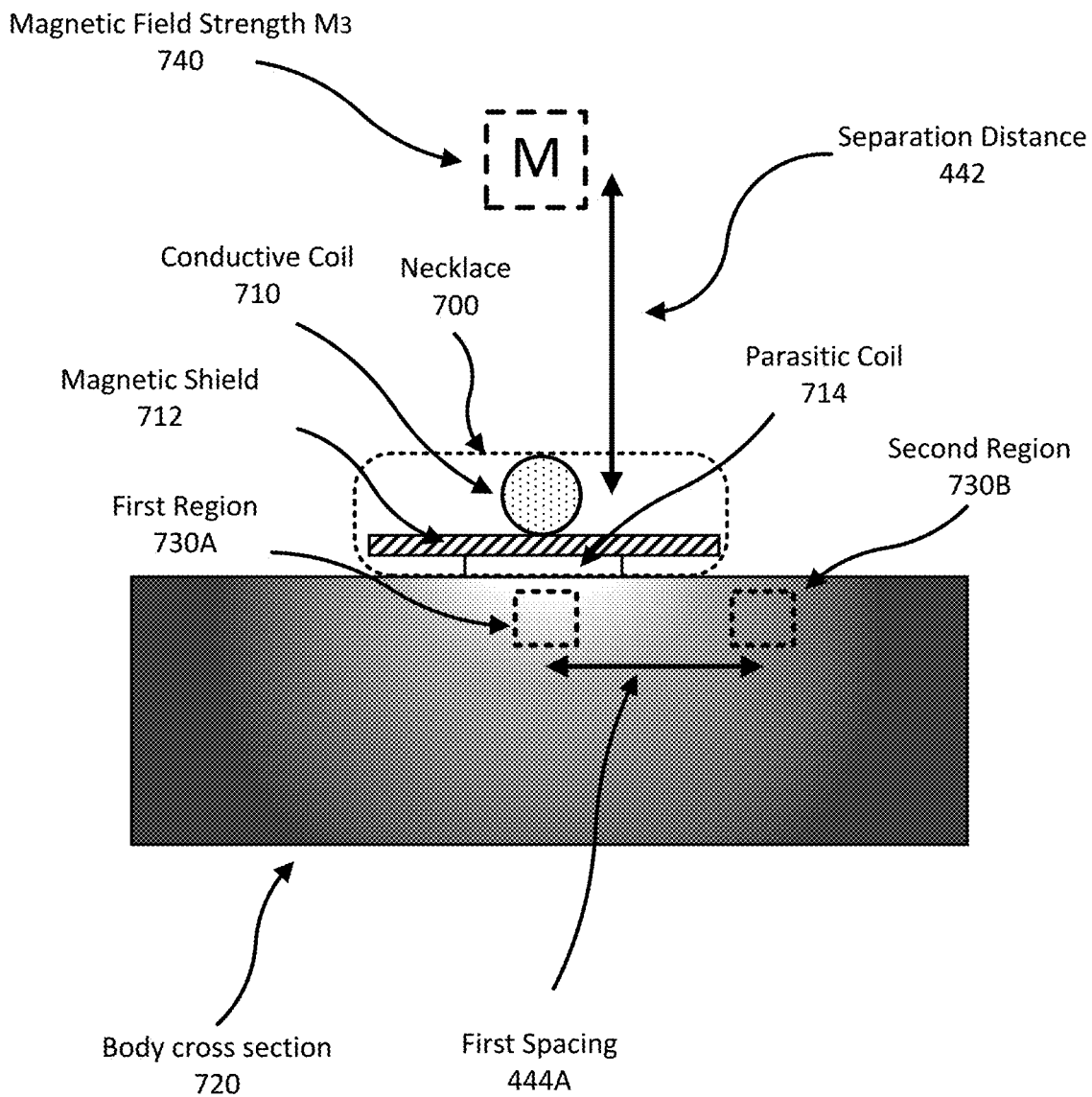
FIG. 7 is a cross-sectional illustration of a necklace including a magnetic shield and parasitic coil on a human body and the corresponding SAR generated by the necklace while it operates as part of an AR system.

Another technique to mitigate SAR in the human body produced by a necklace 110 of an AR system 100 is to include a magnetic shield in necklace 110. For example, FIG. 7 is a cross-sectional illustration of a necklace including a conductive coil 710, a magnetic shield 712, and a parasitic coil 714 on a human body and the corresponding SAR generated by the necklace while it operates as part of an AR system, in one example embodiment. In this example, the necklaces of FIG. 7 and FIG. 4 are largely similar. That is, the conductive coils of the necklaces have similar drive currents, similar cross-sections for their conductive coils, similar lengths, and are made of the same material. Additionally, FIG. 7 and FIG. 4 are illustrated in a similar area of the human body 420 such that the characteristics of the tissue in each illustration are approximately equal. However, the necklace of FIG. 7 includes a magnetic shield 712 and a parasitic coil 714. Here, the parasitic coil 714 cross-section is represented by the white block and the magnetic shield 712 cross-section is represented by the striped polygon. Generally, the magnetic shield 712 is wider than both the conductive coil 710 and the parasitic coil 714. In one example, the magnetic shield 712 is a ceramic ferrimagnetic magnetic material such as ferrite, but can be any other ferrimagnetic material.

The magnetic shield 712 and the parasitic coil 714 shape the TVMF generated by the conductive coil 710 such that SAR in the human body caused by the time-varying magnetic field is mitigated. Generally, the magnetic shield 712 functions to increase the effective separation $S_E$ between the conductive coil 710 and the parasitic coil 714. The effective separation $S_E$ is the separation "experienced" by the magnetic field rather than the real space separation $S_R$ between the conductive coil 710 and the parasitic coil 714. For example, in a necklace 110 without a magnetic shield 712 the effective separation $S_E$ is the same as the real-space separation $S_R$. Conversely, in a necklace 110 with a magnetic shield (e.g., necklace 700), the effective separation $S_E$ is greater than the real-space separation $S_R$. Increasing the effective separation $S_E$ effectively "moves" the conductive coil 710 further away from the human body 420. Therefore, the SAR in the body given the shield necklace 700 of FIG. 7 is less than SAR in the body given the single-coil necklace 400 of FIG. 4. For example, the SAR in the first region 430A of FIG. 4 is greater than SAR in the first region 730A (i.e., the region directly beneath the conductive coil(s) in the human body), and the SAR in the second region 430B of FIG. 4 is greater than SAR in the second region 730B of FIG. 5A (i.e., a region separated from the region directly underneath the conductive coil by a similar spacing 444A).

Further, the magnetic shield 712 and parasitic coil 714 of FIG. 7 mitigates SAR in the body while maintaining the strength of the generated magnetic field at the separation distance. For example, the magnetic field strength $M_3$ 740 in FIG. 7 is approximately similar to (or slightly less than) the magnetic field strength $M_1$ 440 in FIG. 4 at the separation distance 442. The magnetic field strength $M_3$ 740 is approximately similar to the magnetic field strength $M_1$ 440 because of the magnetic shield 712 affects destructive interference. Increasing the effective separation $S_E$ allows a time-varying magnetic field generated by the parasitic coil 714 (e.g., similar to necklace 610E) to localize destructive interference near the human body 420. Additionally, a magnetic shield 712 with a width greater than the conductive coil 710 and the parasitic coil 714 localizes the destructive interference to areas underneath the magnetic shield 712. That is, the TVMF generated by the parasitic coil 714 destructively interferes with the TVMF generated by the conductive coil 710 near the human body 420 to a greater degree than at a separation distance 442. Therefore, the magnetic field strength $M_3$ 740 at the separation distance 442 is dependent on the magnetic shield 712 but can be nearly the same as the magnetic field strength $M_1$ 440 in FIG. 4.

In some configurations, a necklace including a conductive coil 710, a magnetic shield 712, and a parasitic coil 714 can be configured such that the elements overlap along the band of the necklace. That is, the lengths of each element are substantially similar and are stacked one atop the other with respect to the human body (i.e., stacked from bottom to top in the embodiment of FIG. 7). In some cases, the elements are structured within the necklace band such that the surface of the band that comes in contact with the human body is closer to the parasitic coil 714 than the conductive coil 710. Additionally, in some cases, the magnetic shield 712 can be configured in a variety of manners to mitigate energy absorbed by the human body. For example, the magnetic shield 712 can have a width that is greater than the width of the conductive coil 710 and the parasitic coil 714. Further, the magnetic shield 712 can have any thickness where, generally, increasing the thickness decreases the energy absorbed by the human body.

Figure 8:
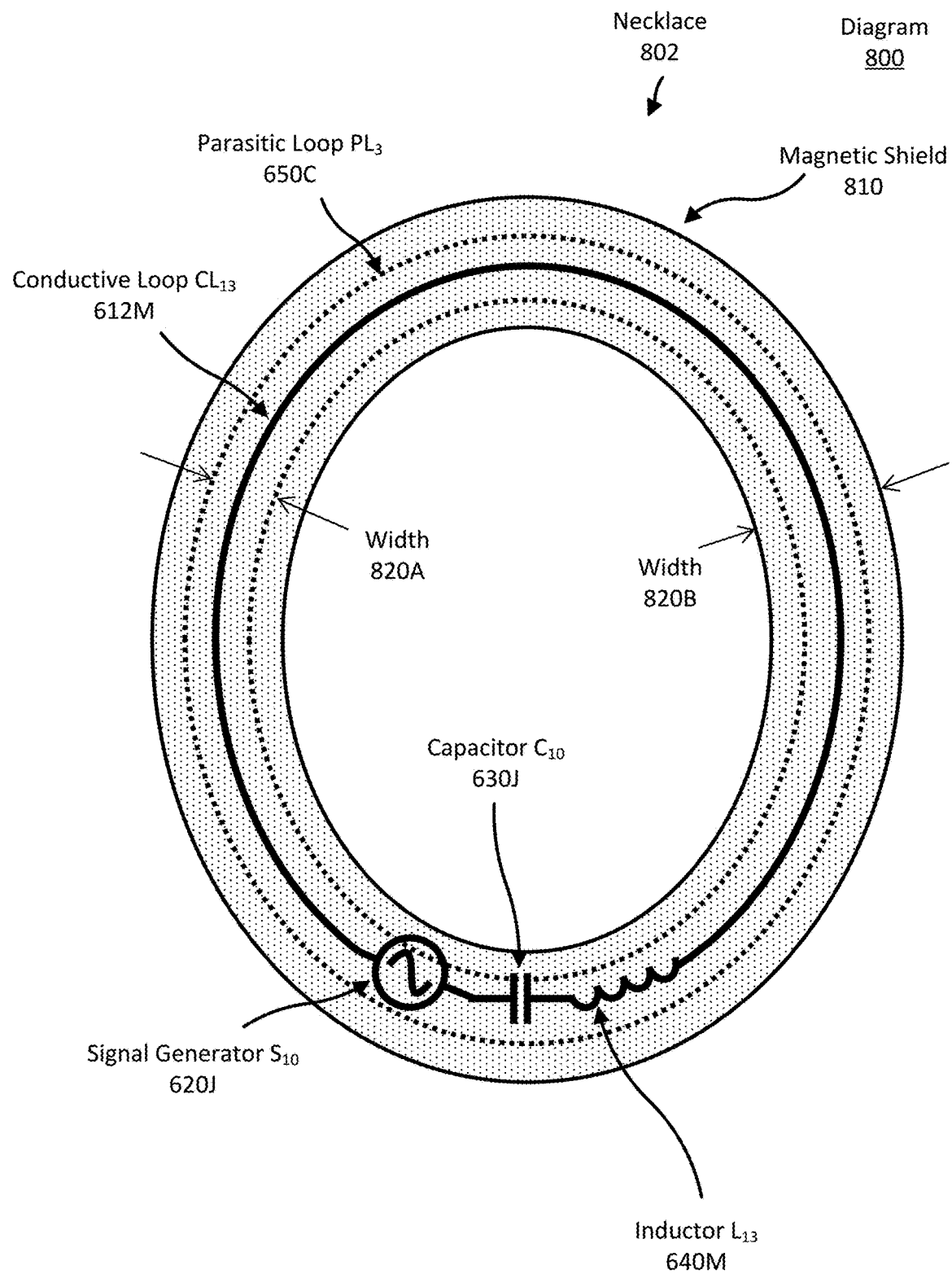
FIG. 8 is a diagram for a necklace that mitigates energy absorbed by the human body using a conductive coil, a parasitic coil, and a magnetic shield.
Figure 9A:
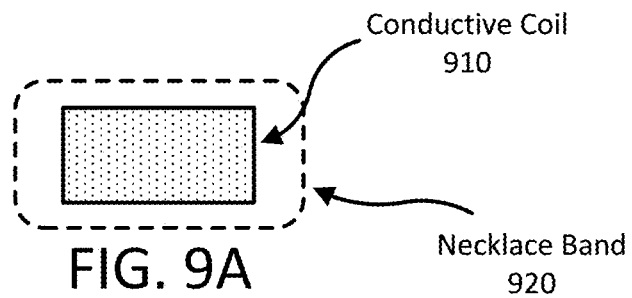
FIGS. 9A-9E are cross-sectional diagrams of a necklace including a single conductive coil of varying shapes.
Figure 9B:
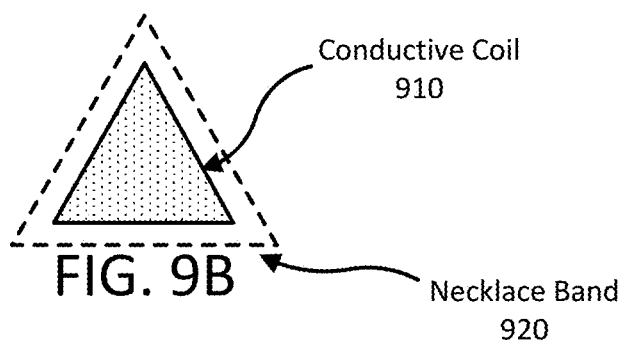
Figure 9C:
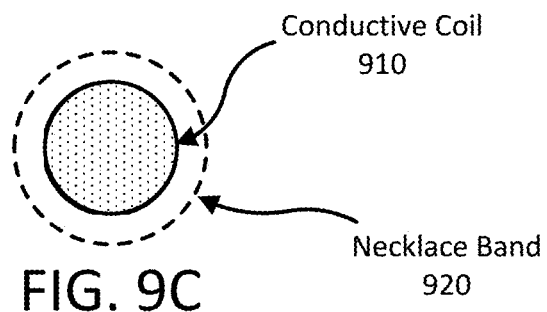
Figure 9D:
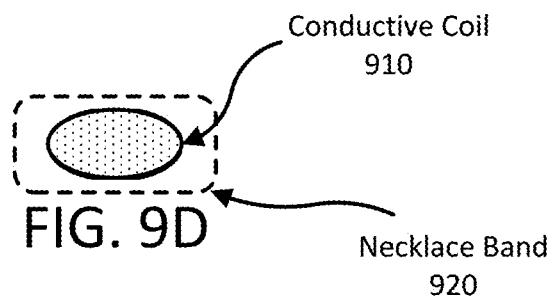
Figure 9E:
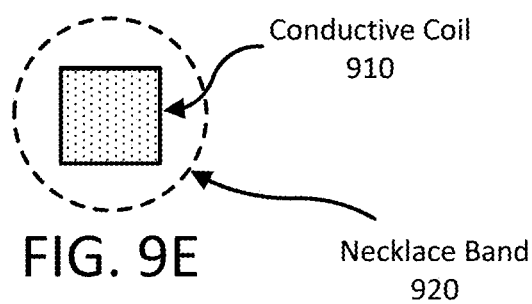

FIG. 8 is a diagram 800 of a necklace 802 that includes a magnetic shield 810 and parasitic loop $PL_2$ 650B, according to one example embodiment. FIG. 8 can be a frontal view of necklace 700 of FIG. 7, in various configurations of necklace 110. In this embodiment, necklace 802 includes a loop circuit having a signal generator $S_{10}$ 620J, a conductive loop $CL_{13}$ 612M (i.e., corresponding to conductive coil 710), inductor $L_{13}$ 640M, and capacitor $C_{10}$ 630J connected in series. Necklace 802 also includes parasitic loop $PL_3$ 650C (i.e., corresponding to parasitic coil 714) and a magnetic shield 810 (i.e., corresponding to magnetic shield 712). Here, the magnetic shield 810 lies below the conductive loop $CL_{13}$ 612M and the parasitic coil $PL_3$ 650C lies below the magnetic shield 810. That is, the conductive loop $CL_{13}$ 612M, magnetic shield 810, and parasitic loop parasitic coil $PL_3$ 650C are stacked one on top of the other into the plane of the page such that a cross-section of necklace 802 is similar to necklace 700 of FIG. 7.

Parasitic coil $PL_3$ 650C, conductive loop $CL_{13}$ 612M, and the magnetic shield 810 are concentric with each other. In the illustrated embodiment, the lengths of the parasitic coil $PL_3$ 650C, conductive loop $CL_{13}$ 612M, and the magnetic shield 810 are similar (i.e., have similar radii) but can be dissimilar. Additionally, the width $W_1$ 820A of the parasitic loop $PL_3$ 650C loop is less than the width $W_2$ 820B of the magnetic shield 810. In this example, the magnetic shield 810 is positioned such that the magnetic shield 810 wholly overlaps parasitic loop $PL_3$ 650C.

In this embodiment, signal generator $S_{10}$ 620J generates an AC current (i.e. drive current) that is converted by the conductive loop $CL_{13}$ 612M into a TVMF. The TVMF generated by the loop circuit induces a parasitic current in parasitic loop $PL_3$ 650C. The parasitic current is in the opposite direction of the drive current. Therefore, parasitic loop $PL_3$ 650C generates a TVMF that is in the opposite direction of the TVMF generated by the loop circuit. The TVMF generated by the parasitic loop $PL_3$ 650C destructively interferes with the TVMF generated by the loop circuit. The magnetic shield 810 increases the effective separation $S_E$ between the parasitic loop $PL_3$ 650C and the conductive loop $CL_{13}$ 612M. Accordingly, the energy absorbed in the human body by the destructively interfering magnetic fields is less than energy absorbed in the human body from a necklace including a single conductive coil. Additionally, the magnetic field strength at a separation distance 442 of necklace 802 can be similar to the magnetic field strength at separation distance 442 of a single-coil necklace.

In various embodiments, the AR system 100 can use a necklace with any configuration of conductive coils, parasitic coils, and magnetic shields. In various embodiments, the position, shape, and number of each element can be similar or dissimilar. Any of the various embodiments can allow for different aesthetic properties to the necklace and necklace band. For example, a necklace can have two conductive coils and a magnetic shield. In other examples, the necklace and its constituent components can have any number of cross-sectional shapes such as a circle, semi-circle, ellipse, arc, square, rectangle, or any other polygon. The combination and configuration of the elements in a necklace 110 of an AR system 100 are configured to maintain a magnetic field strength at a separation distance 442 such that the TVMF produced by the necklace 110 can power a contact lens display 120 while generating SAR in the human body that is below an established safety threshold.

FIGS. 9A-12E provide some example embodiments of various necklace 110 configurations for an AR system 100. The example embodiments are not intended to be limiting, but are given to illustrate that a necklace 110 of an AR system can take a variety of shapes and configurations. In these images, the conductive coils are white shapes, the parasitic coils are grey shapes, and the magnetic shields are shaded shapes.

FIG. 9A-9E are cross-sections of necklaces 110 for an AR system 100 including a single conductive coil 910 within a necklace band 920, according to some example embodiments. The illustrated cross-sections of the single conductive coil 910 include a rectangle, a triangle, a circle, an oval, and a square, but the cross-sections can be any shape. Additionally, while all the illustrated cross-sections are conductive coils, they can be the cross-section of the magnetic shield or parasitic coil. Additionally, the cross-section of the necklace band 920 can take any shape such as a rectangle, a triangle, an oval, a square, or any other shape.

In FIGS. 10A-10E the necklace band (e.g., band 140) is not illustrated for clarity, but the illustrated elements can be within any shape or size of necklace band.

Figure 10A:
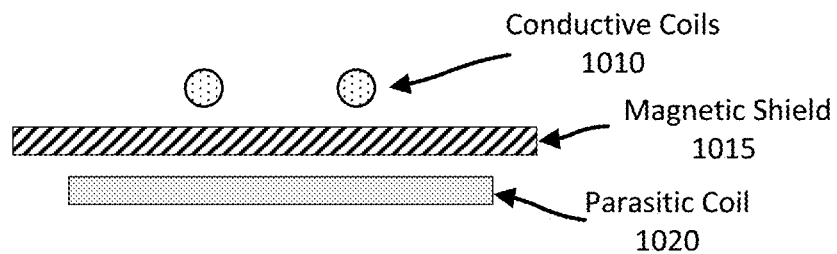
FIGS. 10A-10E are cross-sectional diagrams of necklaces including various numbers of conductive coils, parasitic coils, and magnetic shields.

FIG. 10A is a cross-section of a necklace 110 for an AR system 100 including two independently driven conductive coils 1010, a magnetic shield 1015, and a parasitic loop 1020, according to one example embodiment. In this example, the conductive coils 1010 are circular while the magnetic shield 1015 and parasitic coils 1020 are rectangular.

Figure 10B:
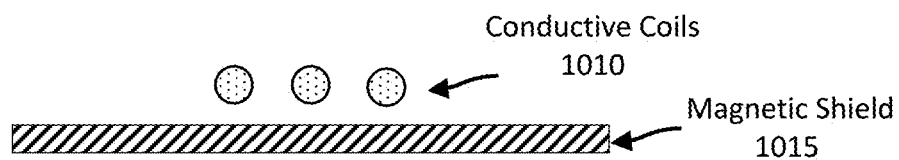

FIG. 10B is a cross-section of a necklace 110 for an AR system 100 including three independently driven conductive coils 1010 and a magnetic shield 1015, according to one example embodiment. In this example, the conductive coils 1010 are circular while the magnetic shield 1015 is rectangular. Generally, a magnetic shield 1015 without a corresponding parasitic coil mitigates SAR in the body to a lesser degree than a necklace 110 including a parasitic coil.

Figure 10C:
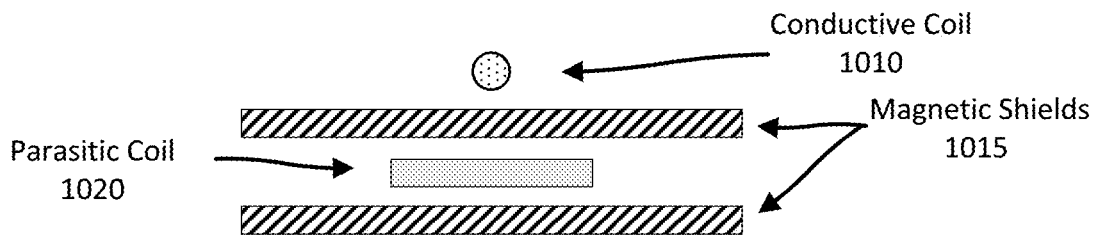

FIG. 10C is a cross-section of a necklace 110 for an AR system 100 including a conductive coil 1010, a parasitic coil 1020, and two magnetic shields 1015 sandwiching the parasitic coil 1020. In this example, the conductive coil 1010 is circular while the magnetic shields 1015 and parasitic coils 1020 are rectangular. Here, the magnetic shield 1015 beneath the parasitic coil 1020 can further mitigate SAR in the human body.

Figure 10D:
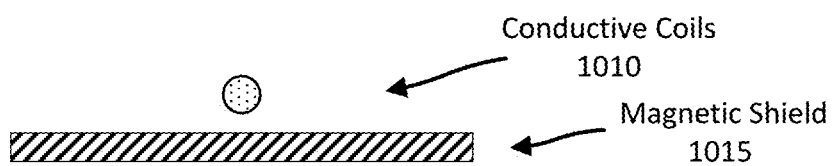

FIG. 10D is a cross-section of a necklace 110 for an AR system 100 including a conductive coil 1010, and a magnetic shield 1015, according to one example embodiment. In this example, the conductive coil 1010 is circular while the magnetic shield 1015 is rectangular.

Figure 10E:
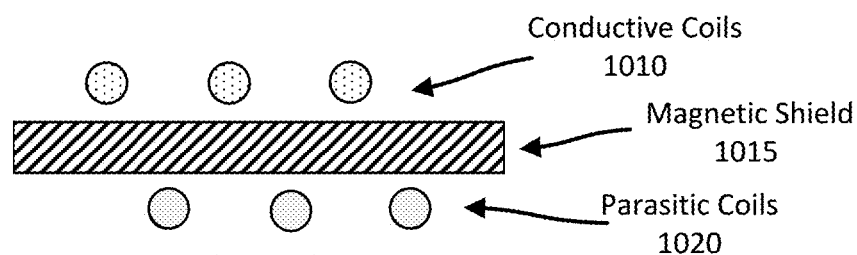

FIG. 10E is a cross-section of a necklace 110 for an AR system 100 including three independently driven conductive coils 1010, a magnetic shield 1015, and three parasitic coils 1020, according to one example embodiment. In this example, the conductive coils 1010 and parasitic coils 1020 are circular while the magnetic shield 1015 is rectangular. Here, the parasitic coils 1020 are offset from the conductive coils to further shape the magnetic field generated by the conductive coils and mitigate the SAR produced in the human body.

In FIGS. 10A-10E the necklace band (e.g., band 140) is not illustrated for clarity, but the illustrated elements can be within any shape or size of necklace band.

Figure 11A:
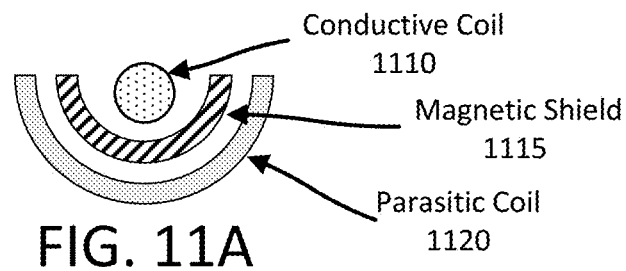
FIGS. 11A-11E are cross-sectional diagrams of necklaces including conductive coils, magnetic shields, and parasitic coils of varying shapes and sizes.

FIG. 11A is a cross-section of a necklace 110 for an AR system 100 including a conductive coil 1110, a magnetic shield 1115, and a parasitic coil 1120, according to one example embodiment. In this example, the conductive coil 1110 is circular, and the magnetic shield 1115 and parasitic coil 1120 are half annuli.

Figure 11B:
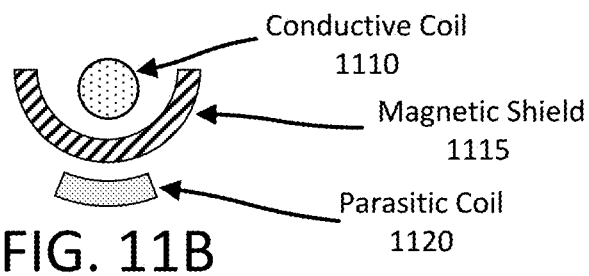

FIG. 11B is a cross-section of a necklace 110 for an AR system 100 including a conductive coil 1110, a magnetic shield 1115, and a parasitic coil 1120, according to one example embodiment. In this example, the conductive coil 1110 is circular, the magnetic shield 1115 is a half annuli, and the parasitic coil 1120 is a small portion of an annuli.

Figure 11C:
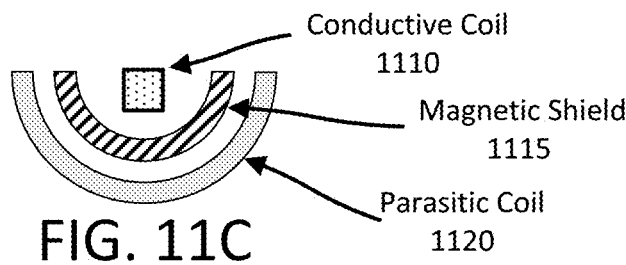

FIG. 11C is a cross-section of a necklace 110 for an AR system 100 including a conductive coil 1110, a magnetic shield 1115, and a parasitic coil 1120, according to one example embodiment. In this example, the conductive coil 1110 is square, and the magnetic shield 1115 and parasitic coil 1120 are half annuli.

Figure 11D:
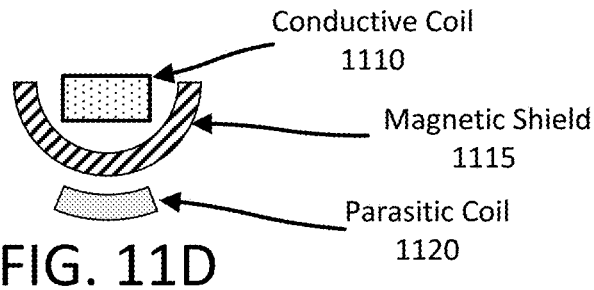

FIG. 11D is a cross-section of a necklace 110 for an AR system 100 including a conductive coil 1110, a magnetic shield 1115, and a parasitic coil 1120, according to one example embodiment. In this example, the conductive coil 1110 is rectangular, the magnetic shield 1115 is a half annuli, and the parasitic coil 1120 is a segment of an annuli.

Figure 11E:
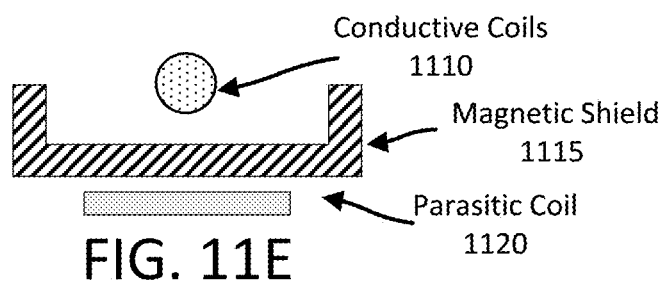

FIG. 11E is a cross-section of a necklace 110 for an AR system 100 including a conductive coil 1110, a magnetic shield 1115, and a parasitic coil 1120, according to one example embodiment. In this example, the conductive coil 1110 is circular, the magnetic shield 1115 is a half rectangular annuli and the parasitic coil 1120 is rectangular.

In some configurations, the magnetic shield can have parasitic coils (or conductive coils) embedded in the magnetic shield. Embedding the parasitic coils in the magnetic shield also increases the effective separation between the parasitic coil (or conductive coil) and the human body which can further mitigate generated SAR. The remaining example embodiments of a necklace 110 of an AR system 100 include magnetic shields with an embedded parasitic coil. In these embodiments the necklace band (e.g., band 140) is not illustrated for clarity, but the illustrated elements can be within any shape or size of necklace band.

Figure 12A:
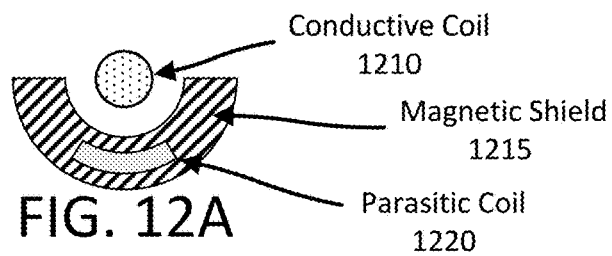
FIGS. 12A-12F are cross-sectional diagrams of necklaces including a conductive coil and a magnetic shield including an embedded parasitic coil.

FIG. 12A is a cross-section of a necklace 110 for an AR system 100 including a conductive coil 1210 and a magnetic shield 1215 with an embedded parasitic coil 1220, according to one example embodiment. In this example, the conductive coil 1210 is circular, the magnetic shield is a half annulus 1215, and the parasitic coil 1220 is segment of an annulus.

Figure 12B:
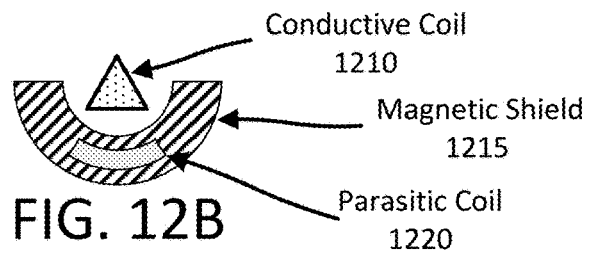

FIG. 12B is a cross-section of a necklace 110 for an AR system 100 including a conductive coil 1210 and a magnetic shield 1215 with an embedded parasitic coil 1220, according to one example embodiment. In this example, the conductive coil 1210 is triangular, the magnetic shield 1215 is a half annulus and the parasitic coil 1220 is segment of an annulus.

Figure 12C:
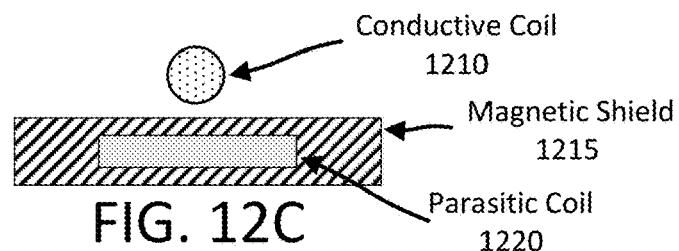

FIG. 12C is a cross-section of a necklace 110 for an AR system 100 including a conductive coil 1210 and a magnetic shield 1215 with an embedded parasitic coil 1220, according to one example embodiment. In this example, the conductive coil 1210 is circular, and the magnetic shield 1215 and parasitic coil 1220 are rectangular.

Figure 12D:
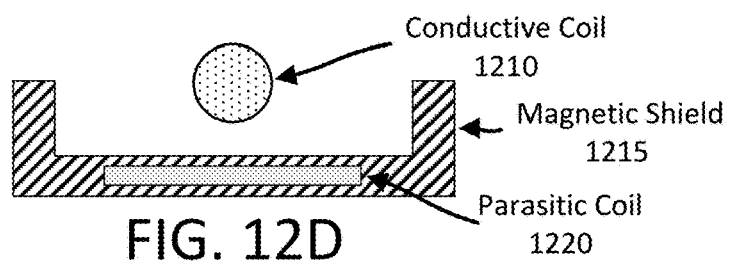

FIG. 12D is a cross-section of a necklace 110 for an AR system 100 including a conductive coil 1210 and a magnetic shield 1215 with an embedded parasitic coil 1220, according to one example embodiment. In this example, the conductive coil 1210 is circular, the magnetic shield 1215 is a half-rectangular annulus, and the parasitic coil 1220 is rectangular.

Figure 12E:
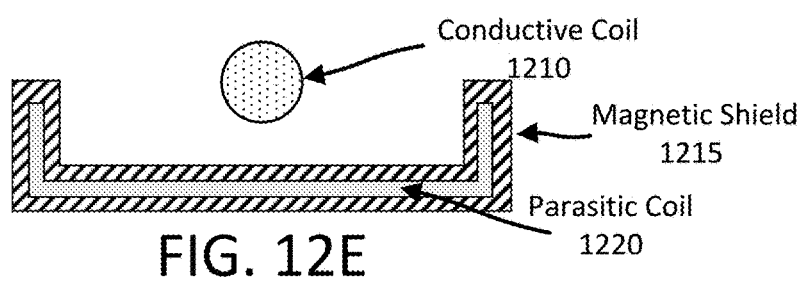

FIG. 12E is a cross-section of a necklace 110 for an AR system 100 including a conductive coil 1210 and a magnetic shield 1215 with an embedded parasitic coil 1220, according to one example embodiment. In this example, the conductive coil 1210 is circular, and the magnetic shield 1215 and parasitic coils 1210 are half-rectangular annuli.

Figure 12F:
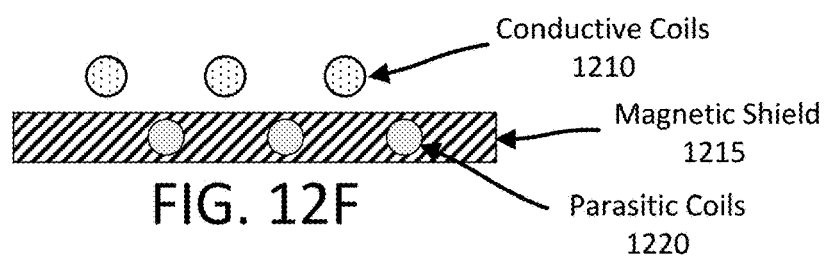

FIG. 12F is a cross-section of a necklace 110 for an AR system 100 including three independently driven conductive coils 1210, and a magnetic shield 1215 with three embedded parasitic coils 1220, according to one example embodiment. In this example, the conductive coils 1210 and parasitic coils 1220 are circular while the magnetic shield 1215 is rectangular. Here, the parasitic coils 1220 are offset from the conductive coils to further shape the magnetic field generated by the conductive coils 1210 and mitigate the SAR produced in the human body.

Although the detailed description contains many specifics, these should not be construed as limiting the scope of the invention but merely as illustrating different examples. It should be appreciated that the scope of the disclosure includes other embodiments not discussed in detail above. Various other modifications, changes, and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

The augmented reality system 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although circuits as shown in FIGS. 6A-6F and FIG. 8 have a limited number of elements in a certain topology, it may be appreciated that the circuits may include more or fewer elements in alternate topologies as desired for a given implementation. The embodiments are not limited in this context.

Depending on the form of the modules, the "connecting" between elements may also take different forms. Dedicated circuitry can be connected to each other by hardwiring or by accessing a common register or memory location, for example. Software "connecting" can occur by any number of ways to pass information between software components (or between software and hardware, if that is the case). The term "connecting" is meant to include all of these and is not meant to be limited to a hardwired permanent connection between two components. In addition, there may be intervening elements. For example, when two elements are described as being connected to each other, this does not imply that the elements are directly connected to each other nor does it preclude the use of other elements between the two.

What is claimed is:

1. A system comprising:
    a necklace comprising:
        a driver circuit comprising a first signal generator to generate a first alternating current (AC) electrical signal and a second signal generator to generate a second AC electrical signal having a same frequency as the first AC electrical signal; and
        a plurality of conductive loops extending along a band of the necklace and including a first conductive loop and a second conductive loop concentric with the first conductive loop, the first conductive loop being driven by the first AC signal and the second conductive loop being driven by the second AC signal to provide wireless power to a remote device via inductive coupling.

2. The system of claim 1, wherein the necklace comprises a first inductor coupled in series with the first conductive loop, the first inductor and the first conductive loop having a first combined inductance; and
    a second inductor coupled in series with the second conductive loop, the second inductor and the second conductive loop having a second combined inductance that is the same as the first combined inductance.

3. The system of claim 1, wherein the remote device is a contact lens display configured to inductively couple to at least one of the first conductive loop and the second conductive loop and to receive the wireless power via the inductive coupling.

4. The system of claim 1, wherein the first conductive loop is spaced apart from and smaller than the second conductive loop.

5. The system of claim 1, wherein a cross-sectional shape of the first conductive loop is one of a square, a circle, a triangle, a rectangle, an oval, a segment of an annulus, or a half rectangular annulus.

6. The system of claim 1, wherein a cross-sectional shape of the second conductive loop is one of a square, a rectangle, a circle, a half annulus, a segment of an annulus, or a half rectangular annulus.

7. The system of claim 1, wherein the necklace further comprises:
a first capacitor coupled in series with the first signal generator and the first conductive loop; and
a second capacitor coupled in series with the second signal generator and the second conductive loop.

8. A system comprising
a necklace comprising:
a driver circuit to generate at least one alternating current (AC) electrical signal; and
a plurality of conductive loops extending along a band of the necklace and including a first conductive loop and a second conductive loop concentric with the first conductive loop, the first conductive loop driven by the AC electrical signal to provide wireless power to a remote device via inductive coupling; and the second conductive loop comprising a parasitic loop inductively coupled to the first conducive loop.

9. The system of claim 8, wherein the second conductive loop is adapted to mitigate an amount of electromagnetic energy from the first conductive loop which is absorbed by a wearer of the necklace.

10. The system of claim 8, wherein
the second conductive coil generates a magnetic field destructively opposing a magnetic field generated by the first conductive loop.

11. The system of claim 8, wherein the first conductive loop has a different length than the second conductive loop.

12. The system of claim 8, further comprising a variable capacitor coupled to the parasitic loop.

13. The system of claim 8, wherein the second conductive loop comprises copper.

14. The system of claim 8, wherein the band of the necklace includes a surface configured to be placed against a wearer of the necklace when the necklace is worn, and the surface of the band is closer to the second conductive loop than the first conductive loop.

15. The system of claim 8, wherein the second conductive loop extends along a length of the first conductive loop and also overlaps with the first conductive loop along the length of the first conductive loop.

16. The system of claim 15, further comprising a loop of ceramic ferrimagnetic material located between the first conductive loop and the second conductive loop.

17. The system of claim 16, wherein the loop of ceramic ferrimagnetic material comprises a ferrite ring.

18. The system of claim 17, wherein the second conductive loop has a first width, and the loop of ceramic ferrimagnetic material has a second width that is wider than the first width.

19. The system of claim 16, wherein the second conductive loop is embedded within the loop of ceramic ferrimagnetic material.

20. The system of claim 16, wherein a cross-sectional shape of the loop of ceramic ferrimagnetic material is one of a square, a rectangle, a circle, a half annulus, a segment of an annulus, or a half rectangular annulus.

* * * * *